United States Patent [19]

Wegner

[11] 4,048,654
[45] Sept. 13, 1977

[54] STEREOPHONIC TELEVISION SOUND TRANSMISSION SYSTEM

[75] Inventor: Carl R. Wegner, La Grange, Ill.

[73] Assignee: Telesonics, Inc., Chicago, Ill.

[21] Appl. No.: 659,101

[22] Filed: Feb. 18, 1976

[51] Int. Cl.$^2$ .............................................. H04N 7/00
[52] U.S. Cl. .................................................. 358/144
[58] Field of Search .................. 178/5.6, 5.8 R, 5.8 A; 179/15 BT; 358/144

[56] References Cited

U.S. PATENT DOCUMENTS

| | | | |
|---|---|---|---|
| 3,046,329 | 7/1962 | Reesov | 178/5.6 |
| 3,099,707 | 7/1963 | Dome | 178/5.6 |
| 3,221,098 | 11/1965 | Feldman et al. | 178/5.8 R |
| 3,936,594 | 2/1976 | Schubin et al. | 178/5.6 |

Primary Examiner—Robert L. Richardson
Attorney, Agent, or Firm—Lockwood, Dewey, Zickert & Alex

[57] ABSTRACT

A compatable stereophonic television sound transmission system for transmitting left and right audio signals in conjunction with a television broadcast wherein video information is conveyed on an amplitude-modulated carrier in a frequency channel having defined frequency limits. The system includes at a transmitter location a multiplex generator for generating a composite signal having a first component representative of the sum of the audio signals, a second component comprising an amplitude-modulated suppressed carrier subcarrier signal representative of the difference between the audio signals, and a pilot component representative of the phase and frequency of the suppressed carrier. The composite signal is utilized to frequency-modulate a sound carrier to develop an RF signal component which is added to the television channel at a discrete frequency spacing from the video carrier. The system includes at a receiver location a tuner for converting the transmission channel to an intermediate frequency, a filter for separating the sound signal therefrom, and a detector for deriving the composite signal from the sound signal. The composite signal is demodulated in a stereo demodulating stage to develop the left and right audio signals. Improved noise performance is obtained in the system by applying preemphasis to the left and right audio signals, preemphasis of the composite signal, enhancement of the second composite signal component, and/or Dolby-B processing of the left and right audio signals or to the composite signal. An adapter is shown for utilizing the system for bilingual programming.

59 Claims, 24 Drawing Figures

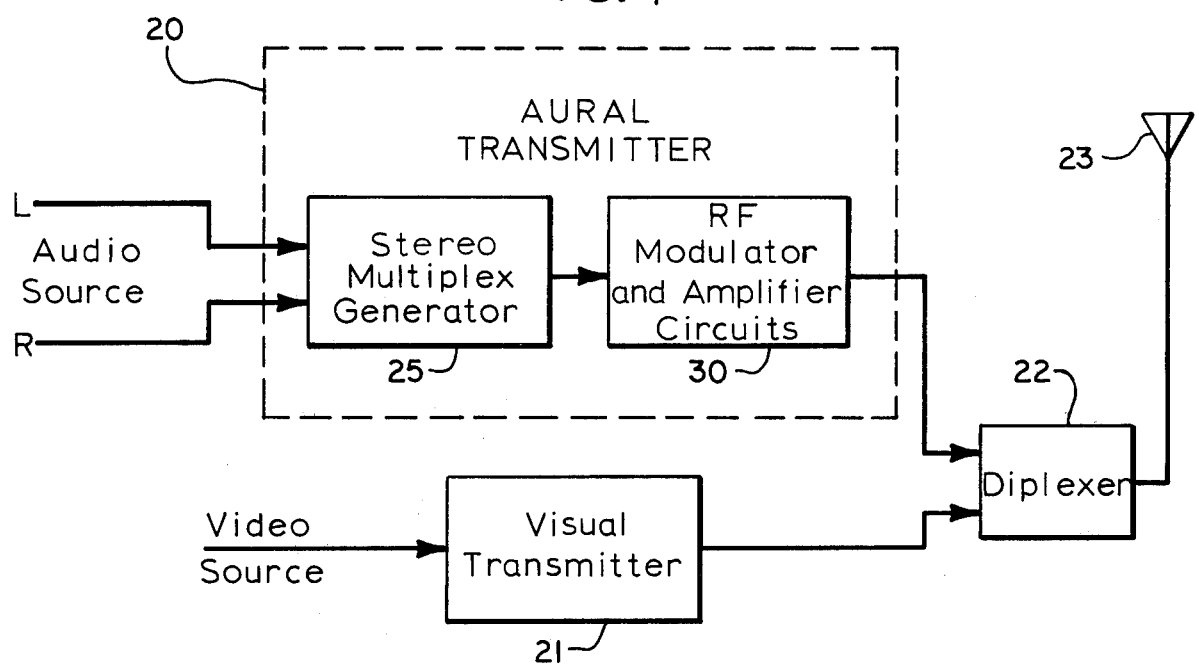
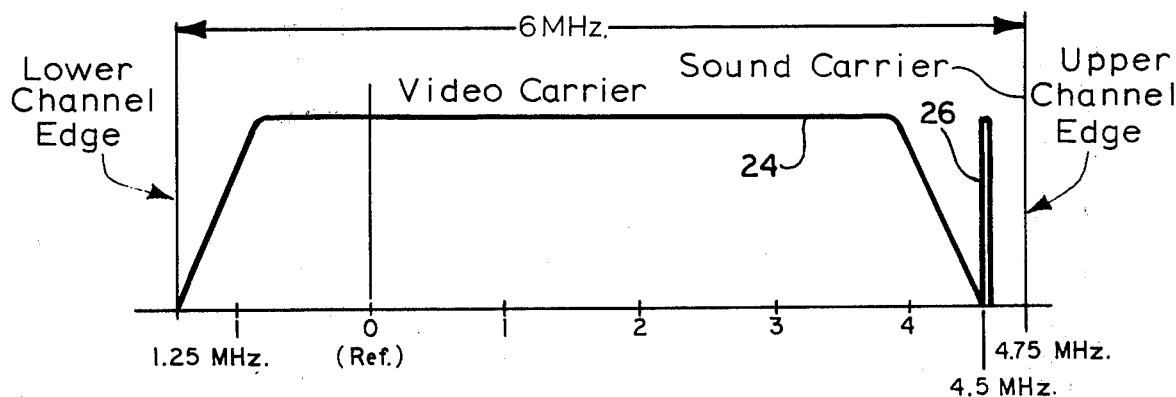
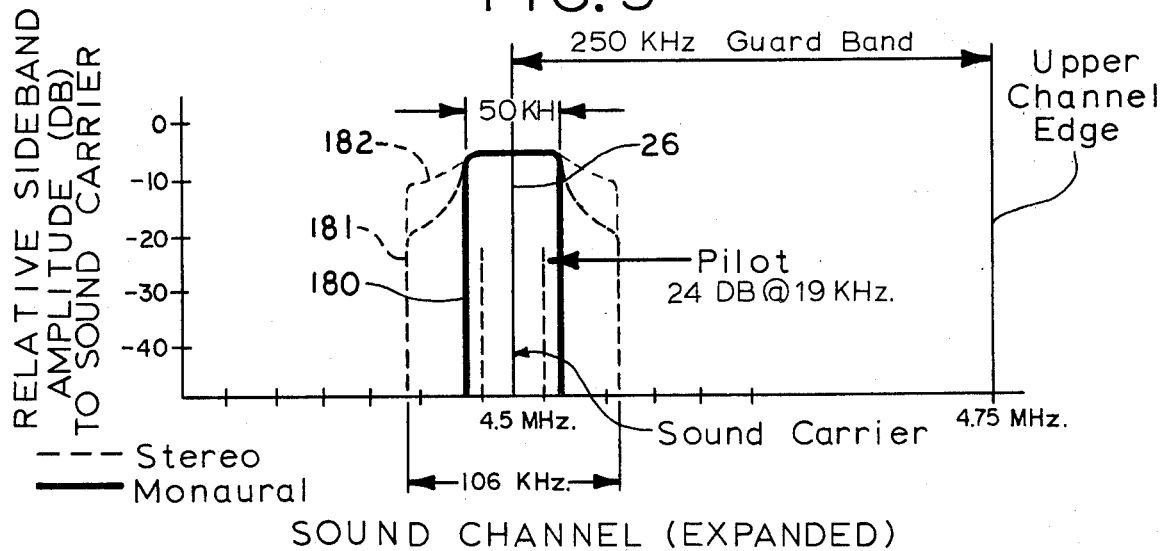

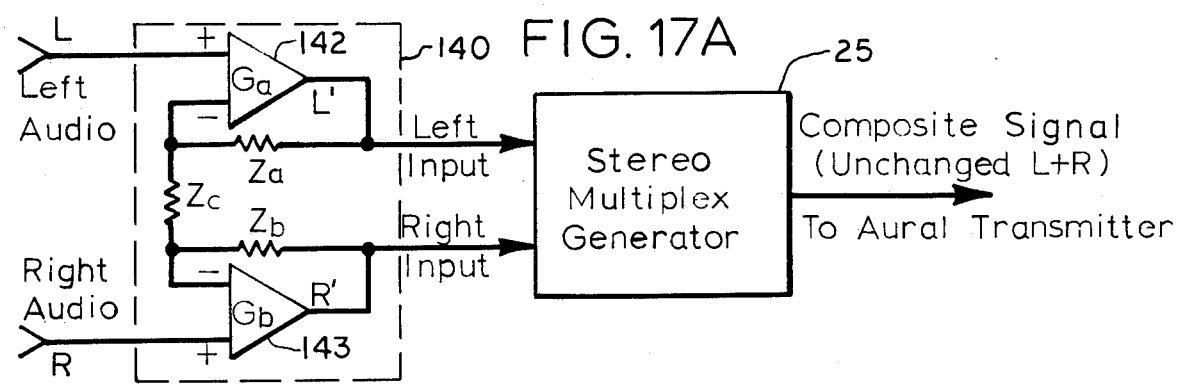
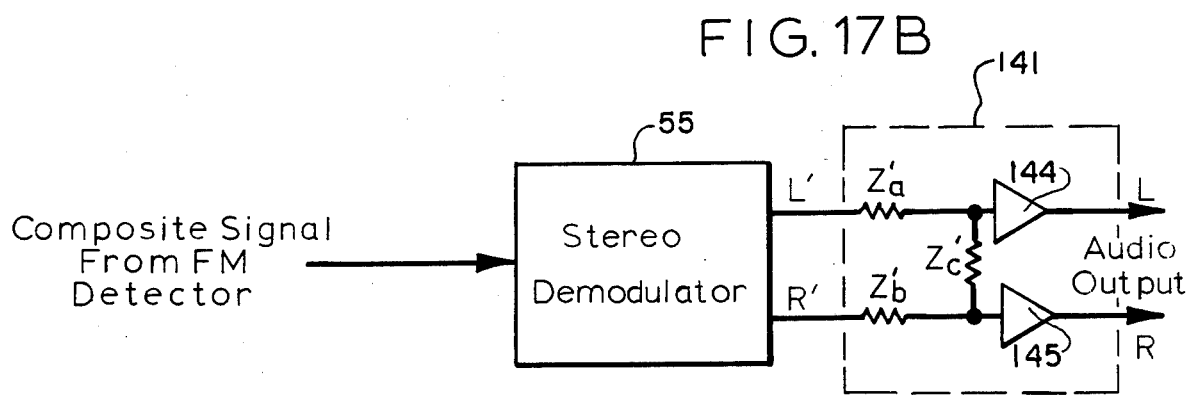
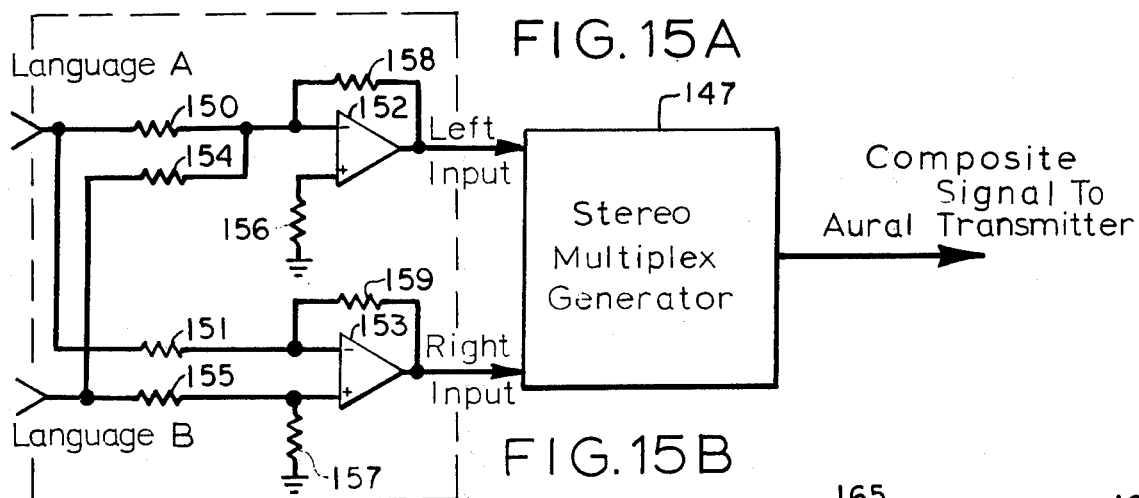
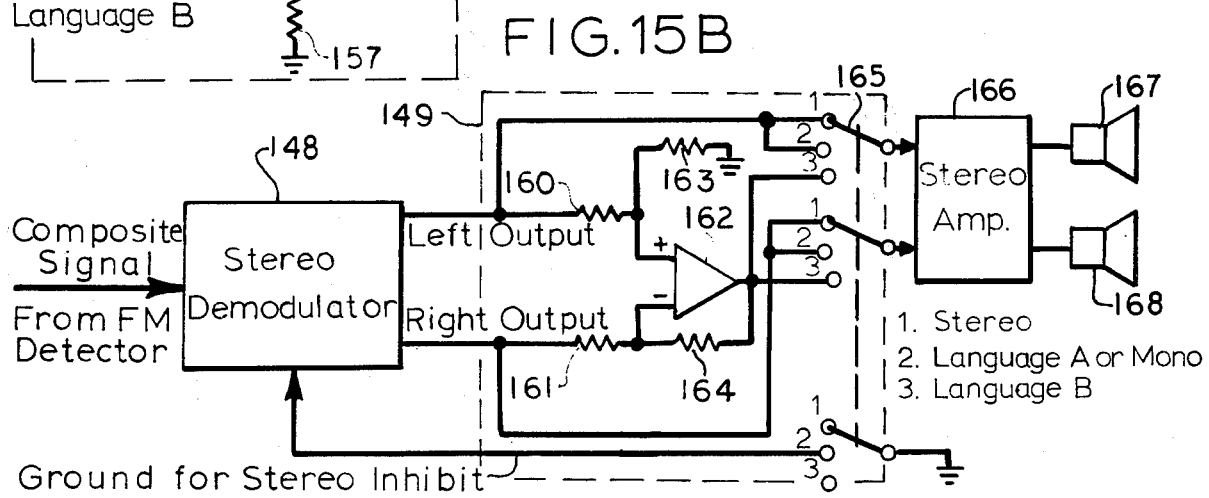

STEREOPHONIC TELEVISION SOUND TRANSMISSION SYSTEM

BACKGROUND OF THE INVENTION

The present application relates generally to sound transmission systems, and more particularly to a stereophonic sound transmission system compatible with present-day U.S. transmission standards, and to apparatus for use therein.

The transmission of stereophonic sound together with a conventional television picture transmission greatly enhances the realism and entertainment value of the program being transmitted. Various systems and apparatus have been proposed for such transmissions including various compatible subcarrier-type systems wherein left-plus-right (L+R) information is conveyed on the regular frequency-modulated sound channel of a composite television broadcast signal, and left-minus-right (L−R) information is conveyed on a subcarrier.

One such system, which was described in "Simultaneous Transmission of Two Television Sound Channels," NHK Laboratories Notes, Ser. No. 132, February 1970, by Yasutaka Numaguchi, Yashitaka Ikeda, and Osamu Akiyama, conveyed L−R information on a single-sideband amplitude-modulated subcarrier frequency-modulated on the standard NTSC aural carrier. To simplify the synchronous detection required for demodulating the subcarrier in this system, the subcarrier was generated at a frequency of 23.625 KHz, or one and one-half times the 15.75 KHz horizontal scanning frequency of U.S. monochrome television broadcasts, enabling the missing subcarrier to be generated in the receiver L−R demodulator by sampling the horizontal deflection signal. This system was found to be unsatisfactory, primarily because of the insufficient subchannel bandwidth, poor channel separation and ambiguity in development of the left (L) and right (R) audio signals at the receiver.

Another system proposed for sterophonic television sound transmission utilized a frequency-modulated subcarrier centered at 31.5 KHz, or twice the horizontal scanning frequency. This subcarrier, when frequency-modulated on the NTSC-standard aural carrier, provided an L−R bandwidth of 12 KHz. However, when it was attempted to add stereophonic demodulation capability to the 4.5 MHz sound channel of standard intercarrier-type television receivers to recover the L−R component, video signal component contamination resulted to an extent that satisfactory L−R audio signals could not be obtained without extensive modification of the receivers. Applying such subcarrier signals to conventional split-sound receivers, wherein separate intermediate frequency (IF) channels are provided for video and sound components, is not practical since the 41.25 MHz sound IF output of conventional modern TV tuners is above the range at which presently employed sound channel IF filters can achieve the required effectiveness.

Another system, which was proposed in U.S. Pat. No. 3,099,707 to R. B. Dome, utilized an amplitude-modulated suppressed-carrier subcarrier component, centered at 23.625 KHz to avoid interference with harmonics of the horizontal scanning signal, frequency-modulated on the sound carrier. To facilitate regenerating the subcarrier for demodulation purposes at the receiver a 39.375 KHz pilot signal was transmitted which, when combined with the 15.75 KHz horizontal scanning signal present in the receiver, resulted in generation of the suppressed 23.625 KHz carrier. This system did not provide satisfactory performance in that the bandwidth of the L−R channel was limited to 8 KHz with symmetrical sidebands. Attempting to increase available bandwidth by the use of assymmetrical sidebands was not practical because this introduced a principal harmonic of the horizontal scanning signal into the upper sideband of the L−R component.

Two additional systems, which differed from those proposed in the afore-described systems in that they employed a subcarrier centered at 31.5 KHz, or twice the horizontal scanning frequency, were shown in U.S. Pat. Nos. 3,046,329 to T. W. Reesor and 3,219,759 to R. B. Dome. The first system was a single-sideband system which necessitated the provision of complex filtering and demodulation circuitry in the receiver if unacceptably narrow L−R channel bandwidth was to be avoided. The second system, like other intercarrier systems, was susceptible to video signal component contamination in the sound channel. Furthermore, both of these systems required connection to or at least non-destructive sampling of the horizontal deflection signal within the receiver, necessitating in the case of an add-on adapter a modification of the receiver and the provision of an additional cable to a converter, thereby increasing installation cost and reducing the versatility of the converter.

In contrast, the system of the present invention utilizes an amplitude-modulated double-sideband suppressed-carrier 38 KHz subcarrier L−R component frequency-modulated on the main aural carrier together with a 15 KHz bandwidth L+R component and a 19 KHz pilot carrier. This forms a composite signal which is similar to that employed in stereophonic FM broadcasts in the United States. The use of this system simplifies the demodulation process at the receiver, and provides a signal which is compatible with conventional nonstereophonic sound television receivers. Also, the proposed system lends itself to use with self-contained converters of a design and construction which may be readily utilized in conjunction with existing monochrome or color television receivers.

Accordingly, it is a general object of the present invention to provide a new and improved system and apparatus for transmitting stereophonic sound information in conjunction with a standard television transmission.

It is another object of the present invention to provide a system and apparatus for transmitting stereophonic television sound which provides improved performance and which is less subject to interference from an accompanying video transmission.

It is another object of the present invention to provide receiving apparatus for receiving a subcarrier-type compatible stereophonic transmission which apparatus can be conveniently installed on an existing television receiver with minimal modifications to the receiver.

It is another object of the present invention to provide a converter for receiving a compatible stereophonic television sound transmission of the subcarrier-type which can be used in conjunction with a conventional stereophonic FM receiver.

It is another object of the present invention to provide apparatus for receiving a subcarrier-type stereophonic television sound transmission which can be economically constructed using standard commercially available components.

It is another object of the present invention to provide a system and apparatus for transmitting bilingual sound in conjunction with a standard television transmission.

SUMMARY OF THE INVENTION

The invention is directed to a stereophonic sound transmission system for transmitting left and right audio source signals in conjunction with a video source signal wherein the video source signal is modulated on an RF carrier within a television broadcast channel having defined frequency limits. The system includes generator means including a stereo multiplex generator for generating a composite signal including a first component representative of the sum of the left and right source signals, a second amplitude-modulated subcarrier component representative of the difference between the left and right signals, the subcarrier component having upper and lower sidebands centered about a suppressed carrier, and a pilot component representative of the phase and frequency of the suppressed carrier. Transmitter means responsive to the composite signal are included in the system for generating a frequency-modulated signal in the broadcast channel, the center frequency of the signal having a predetermined spacing from the video-modulated signal, and receiver means for receiving the television broadcast channel including means for deriving the composite signal, and demodulator means for developing the left and right audio source signals from the composite signal.

The invention is further directed to a method of transmitting stereophonic sound consisting of left and right audio source signals in conjunction with a video source signal wherein the video source signal is modulated on an RF carrier within a television broadcast channel having defined frequency limits. The method comprises the steps of generating a composite signal including a first component representative of the sum of the left and right source signals, a second amplitude-modulated subcarrier component representative of the difference between the left and right signals, the subcarrier component having upper and lower sidebands centered about a suppressed carrier, and a pilot component representative of the phase and frequency of the suppressed carrier; utilizing the composite signal to generate a frequency-modulated signal in the broadcast channel, the center frequency of the signal having a predetermined spacing from the video-modulated signal; conveying said video- and audio-modulated signals in the broadcast channel to a receiving location, and at the receiving location, developing the composite signal form the audio-modulated signal in the channel; and developing the left and right audio source signals from the composite signal.

The invention is further directed to a receiver for receiving stereophonic sound transmissions included on a television broadcast channel of defined frequency limits, wherein the sound transmission comprise a sound carrier frequency-modulated by a composite signal including a first component representative of the sum of the left and right source signals, a second amplitude-modulated subcarrier component representative of the difference between the left and right signals, the subcarrier component having upper and lower sidebands centered about a suppressed carrier, and a pilot component representative of the phase and frequency of the suppressed carrier. The receiver includes tuner means for converting the television broadcast channel to an intermediate frequency channel including an intermediate frequency sound signal sound bandpass filter means for separating the sound signal from the intermediate frequency channel, sound detector means for deriving from the intermediate frequency sound signal a composite signal including the first, second and third components, and stereo demodulator means for deriving the left and right source signals from the composite signal.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 1 is a functional block diagram of the transmitting portion of a stereophonic television sound transmission system constructed in accordance with the invention.

FIG. 2 is a graphic presentation of the frequency spectrum of a standard U.S. television channel.

FIG. 5 is a graphic presentation of the frequency spectrum of a television sound channel showing the effect thereon of stereophonic sound transmission in accordance with the present invention.

FIG. 15A is a schematic diagram partially in functional block form of the transmitter portion of a system for bilingual television sound transmission in accordance with the invention.

FIG. 15B is a schematic diagram partially in functional block form of the receiver portion of a system for bilingual television sound transmission in accordance with the invention.

FIG. 17A is a schematic diagram partially in functional block form of the transmitter portion of a system for L−R component enhancement in accordance with the invention.

FIG. 17B is a schematic diagram partially in functional block form of the receiver portion of a system for L−R component enhancement in accordance with the invention.

DESCRIPTION OF THE PREFERRED EMBODIMENT

Referring to the Figures, and particularly to FIGS. 1-6, a stereophonic sound transmission system constructed in accordance with the invention may be employed in conjunction with an aural transmitter 20 and a visual transmitter 21, which may be conventional in design and construction. The radio frequency (RF) output signals from the two transmitters are combined in a conventional RF signal diplexer 22 and radiated by means of a common transmitting antenna 23.

Figure 3:
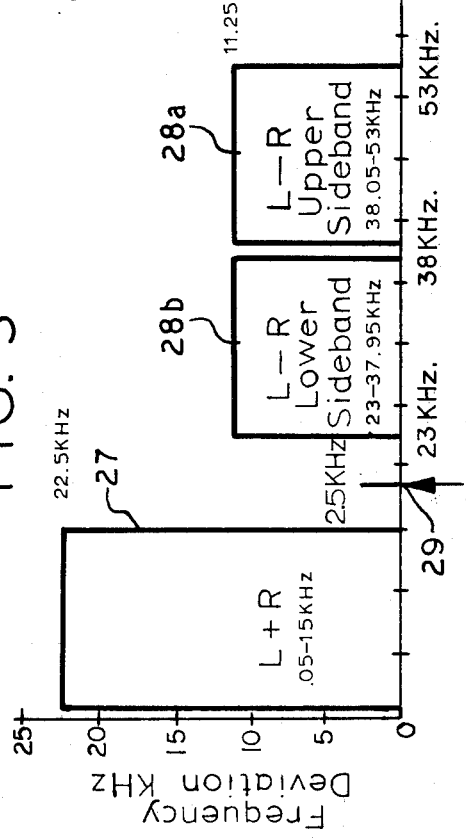
FIG. 3 is a graphic presentation of the composite signal generated by the stereophonic television sound transmission system of the present invention.

Video source signals such as may be obtained from cameras, film chains, video tape recorders or the like, are applied to the visual transmitter 21 to produce an amplitude-modulated (AM) RF output signal 24 having the bandpass characteristic shown in FIG. 2. At the same time, left (L) and right (R) stereophonic audio signals, such as may be obtained from microphones, tape decks, turntables, or the like, and which typically represent the sound level at two different locations in the scene being televised, are applied to the aural transmitter 20. Within this transmitter these signals are applied to an stereo multiplex generator 25, which may be similar in construction and operation to those utilized in conventional stereo FM broadcast transmitters. The output of generator, in accordance with the invention, consists of a composite signal which includes a direct L+R audio component 27, a double-sideband L−R component 28 consisting of upper and lower sidebands 28a and 28b centered at 38KHz, and a 19 KHz pilot component 29, as shown in FIG. 3. This signal is applied to conventional RF modulater and amplifier circuits 30 within aural transmitter 20 to develop a frequency modulated RF output signal 26 centered 4.5 MHz from the video signal, as shown in FIG. 2.

Figure 4:
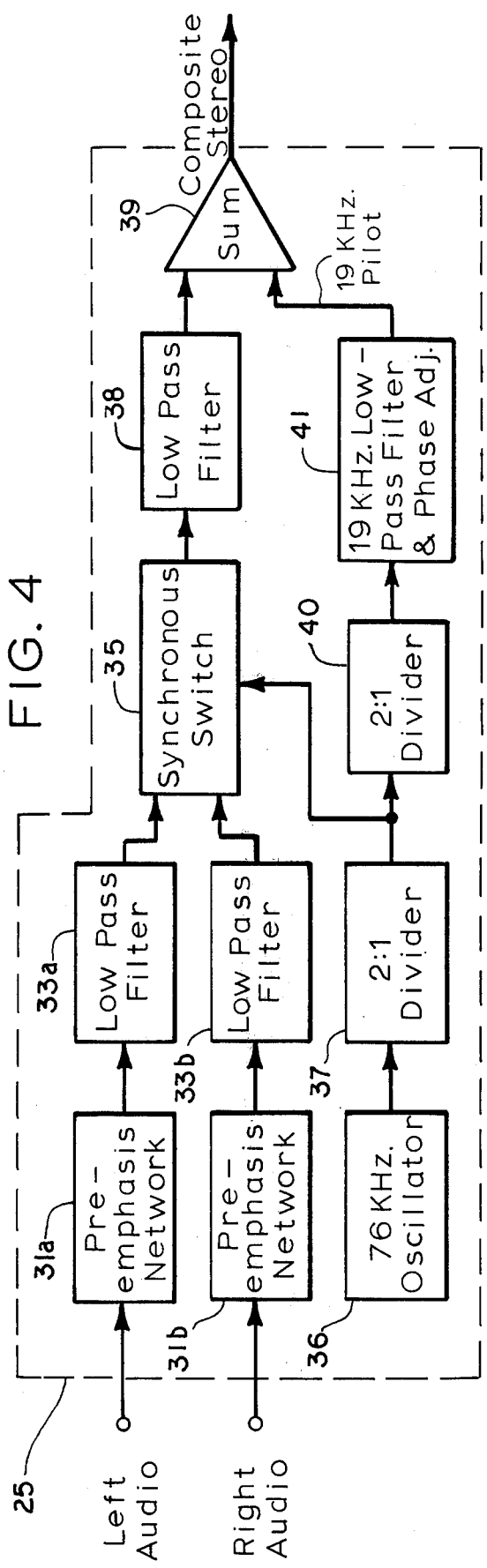
FIG. 4 is a functional block diagram of a stereophonic multiplex generator for use in the stereophonic television sound transmission system of the invention.

Referring to FIG. 4, the multiplex generator 25 may include a pair of pre-emphasis networks 31a and 31b and a pair of 17 KHz low pass filters 33a and 33b for the L and R channels, respectively. As is well known to the art, the pre-emphasis circuits impose a frequency response characteristic on the L and R signals which emphasizes the higher frequencies to improve the signal-to-noise ratio of the transmitted program. The low pass filters 33a and 33b serve to prevent input signals exceeding 17 KHz from affecting the 19 KHz pilot and L−R components. The left and right audio signals from filters 33a and 33b are applied to a synchronous switching stage 35 wherein they are alternately sampled to develop the L+R and L−R components in a manner well known to the art. The operation of switching stage 35 is controlled by a 38 KHz square wave signal, which is generated by means of a 76 KHz crystal-controlled oscillator stage 36 and a 2:1 frequency divider stage 37.

After further filtering in a 60 KHz low pass filter 38 to remove harmonics which may exist in the composite signal above 53 KHz, the output of the synchronous switching stage 35 is combined with a 19 KHz pilot signal in a summing stage 39. The pilot signal is derived by means of an additional 2:1 frequency divider stage 40 and 19 KHz low pass filter and phase adjustment stage 41 to assure precise time coincidence with the 38 KHz sampling action of switching stage 35.

Referring to FIG. 3, in the basic system contemplated by the invention the L+R signal component 27 generated by stereo multiplex generator 25 preferably has a frequency range extending from 50 Hz to 15 KHz and an amplitude sufficient to produce a maximum sound carrier frequency deviation of 22.5 KHz. The L−R signal component 28 consists of lower and upper side band components 28a and 28b preferably centered about a 38 KHz suppressed carrier and extending from 23 to 37.95 KHz and 38.05 to 53 KHz, respectively, each having an amplitude sufficient to produce a maximum frequency deviation of 11.25 KHz in the sound carrier. The 19 KHz pilot component 29, which is preferably centered between the lower sideband 28b and the L+R component 27, is transmitted at a frequency deviation of 2.5 KHz in the sound carrier. As shown in FIG. 3, for the illustrated embodiment the total bandwidth required by the composite signal is 53 KHz and, by reason of the amplitude limitations imposed on the L+R, L−R, and pilot components, the maximum deviation of the sound carrier is 25 KHz.

In accordance with one aspect of the invention, the frequency of the pilot carrier may be increased to 5/4 the horizontal scanning rate of the video transmission (Fh), or 19.6875 KHz in the case of U.S. monochrome transmission and 19.66783 KHz in the case of U.S. color transmissions. This centers the suppressed carrier between the second and third harmonics of the horizontal scanning frequency, which harmonics have been found to be a principal cause of interference in prior-art stereophonic sound systems which lacked adequate video component rejection. This also reduces interference to the L−R component to a single component at approximately 7.8 KHz instead of three components at 6.5 KHz, 9.25 KHz and 2.75 KHz (beat between the 6.5

KHz and 9.25 KHz components perceived by a listener) as with a 19 KHz pilot carrier.

Figure 6:
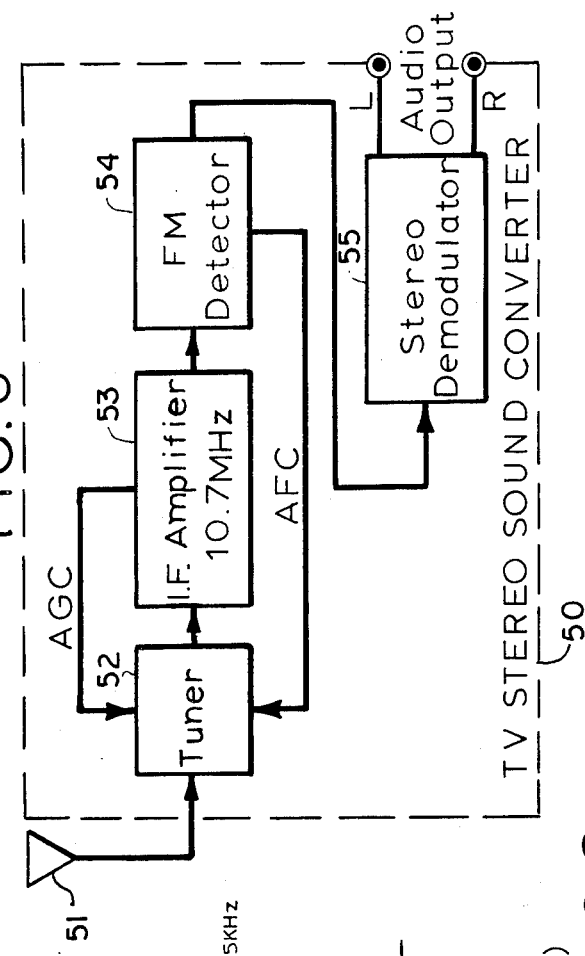
FIG. 6 is a functional block diagram of a single-conversion converter for allowing reception of stereophonic television sound transmissions in accordance with the present invention.

A stereophonic sound converter 50 for receiving stereophonic sound transmissions in accordance with the invention is shown in FIG. 6. This converter operates independently of the television receiver, having an input for direct connection to a conventional television antenna 51 and L and R audio outputs for connection to an external stereo amplifier and speaker system. The RF signals intercepted by antenna 51 are applied to a user-adjustable tuner 52 within the converter wherein the desired television channel is selected, amplified and converted to a suitable intermediate frequency, in this case 10.7 MHz. The intermediate frequency (IF) signal is applied to an IF amplifier stage 53, wherein additional amplification and limiting are provided. The amplified IF signal is applied to a conventional FM detector stage 54 wherein a composite audio signal having L+R, L−R and pilot signal components as depicted in FIG. 3 is developed in a manner well known to the art. In addition, detector 54 may also develop an automatic frequency control (AFC) voltage for application to tuner 52 to maintain the tuner properly tuned to the desired station, and the IF amplifier stage 53 may develop an AGC signal which is applied to tuner 52 to maintain a constant signal level.

Figure 7:
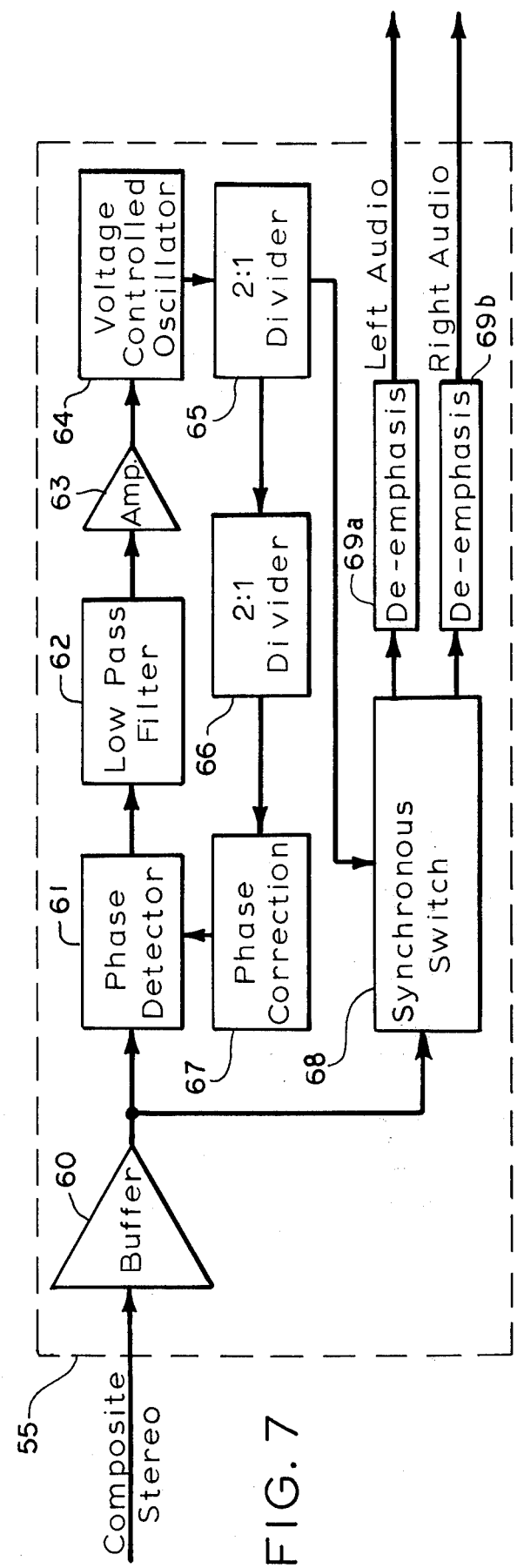
FIG. 7 is a functional block diagram of a stereo demodulator for use in the stereophonic television sound transmission system of the present invention.

In order to obtain the L and R audio signals necessary for driving a stereo amplifier and speaker system the composite signal from detector 54 is applied to a stereo demodulator 55, which serves as the counterpart of the stereo multiplex generator 25 in the transmitter. In its most basic form the demodulator 55 may include a commercial integrated-circuit (IC) type stereo demodulator circuit similar to those commonly employed in stereo FM broadcast receivers together with necessary de-emphasis circuits for the L and R audio outputs of the circuit. Referring to FIG. 7, within such a demodulator circuit the composite signal is typically amplified by a buffer amplifier 60 and applied to a phase-detector 61, which comprises part of a phase-lock loop. The phase-lock loop includes a low-pass filter 62, a DC amplifier 63, a voltage-controlled 76 KHz oscillator 64, two 2:1 frequency divider stages 65 and 66, and a phase correction circuit 67 whose output is presented as a second input to the phase detector 61 for comparison with the composite input signal. The phase-lock loop is designed to lock onto the 19 KHz pilot carrier and product its 38 KHz second harmonic in correct phase to control synchronous switch stage 68.

The synchronous switch 68 alternatively samples the composite stereo input signal at a 38 KHz rate, synchronized precisely in time and in the same sequence as the corresponding samples are assembled by the synchronous switch 35 in stereo multiplex generator 25 (FIG. 1) in forming the composite signal at the transmitter. As is well known to the art, this results in the L and R audio signals being developed at the output of the switch, and these derived audio signals are applied to respective ones of two de-emphasis networks 69a and 69b wherein a predetermined frequency response characteristic is introduced to compensate for the pre-emphasis characteristic introduced at the transmitter. The L and R audio outputs of the synchronous switch may be applied to an external stereo amplifier and speaker system, or alternatively applied to suitable audio amplifier stages and/or speakers provided within the converter.

Figure 8:
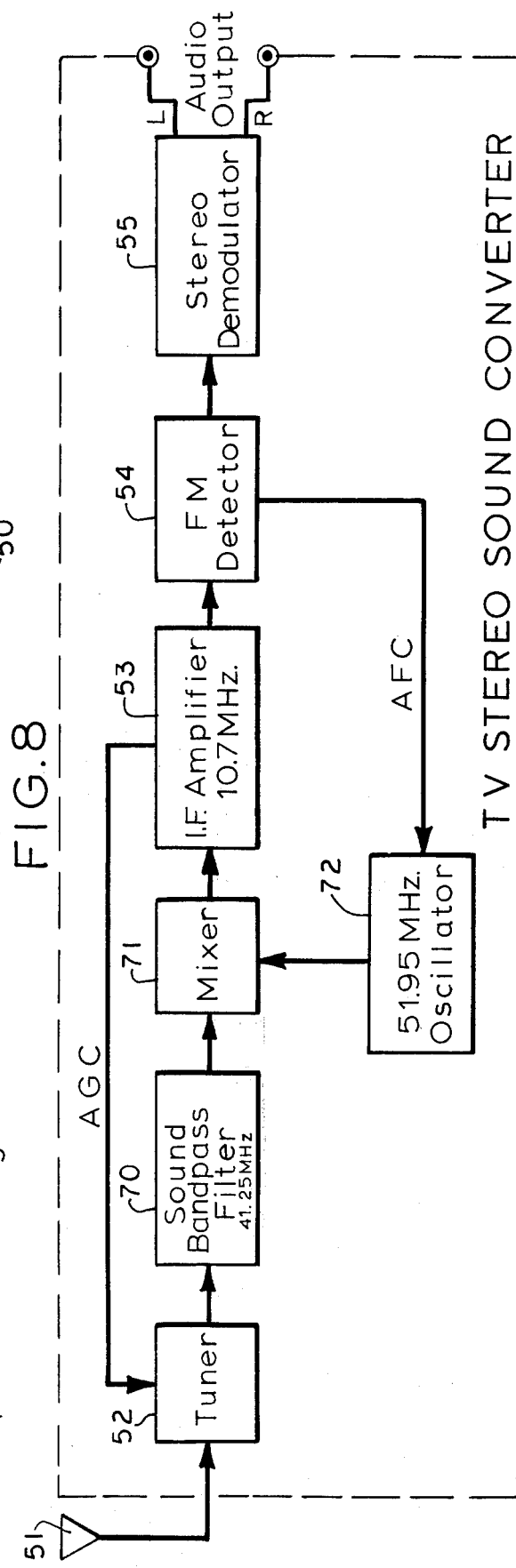
FIG. 8 is a functional block diagram of a double-conversion converter for use in receiving stereophonic television sound transmissions in accordance with the present invention.

A dual-conversion version of the stereophonic television sound converter is shown in FIG. 8. In this embodiment turner 52 converts the selected television broadcast signal to an IF signal which includes a video component centered at 45.75 MHz and a sound component centered at 41.25 MHz. This signal is applied to a 41.25 MHz bandpass filter 70 wherein the sound component is separated and applied to a mixer stage 71. Within mixer state 71 the IF sound component is combined with a 51.95 MHz, or alternatively, a 30.55 MHz continuous wave signal from an oscillator stage 72 to develop a second IF signal at 10.7 MHz. This signal is amplified and amplitude-limited in a conventional 10.7 MHz IF amplifier stage 53 prior to application to an FM detector 54, wherein it is converted to a composite stereo signal having L+R, L−R and pilot signal components as depicted in FIG. 3. In addition, as in the previously described single-conversion converter of FIG. 6, IF amplifier stage 53 may develop an AGC voltage for application to turner 52 and detector 54 may develop an AFC voltage for centering the IF frequency, the AFC voltage being applied to either oscillator 72 or tuner 52.

Image rejection for the dual-conversion converter is superior to that for the 10.7 MHz IF single-conversion converter, in that the 41.25 MHz first intermediate frequency provides greater separation between the frequency of the received signal and the image frequencies to which the receiver is subject. With the 41.25 MHz IF channel the receiver is subject to a primary image band 82.5 MHz removed from the received broadcast and a potential secondary interference band 20.625 MHz removed from the broadcast which can be doubled in the mixer and thereby pass through the IF amplifier. Fortunately, frequencies that far removed are efficiently rejected by normal tuner selectivity in the dual-conversion converter. However, in the single-conversion converter these primary and secondary frequency bands are removed from the described signal by only 21.4 MHz and 5.35 MHz respectively, the proximity of the latter being such that a portion of the video spectrum of the selected channel and an adjacent channel may pass through the IF amplifier to contaminate the sound channel. Therefore, the tuner for the single-conversion converter must exhibit far greater selectivity than that utilized in the dual-conversion converter. The problem of discriminating against secondary interference in the single-conversion receiver may be ameliorated by adopting an IF slightly greater than 10.7 MHz.

Figure 9:
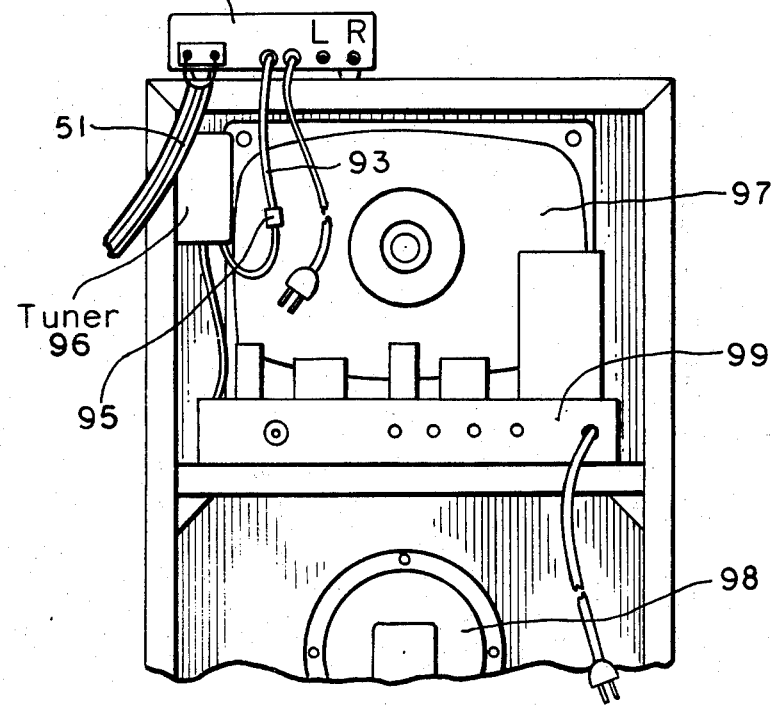
FIG. 9 is a rear elevational view of a television receiver and adapter for allowing stereophonic television sound transmissions in accordance with the present invention to be received by the receiver.
Figure 10:
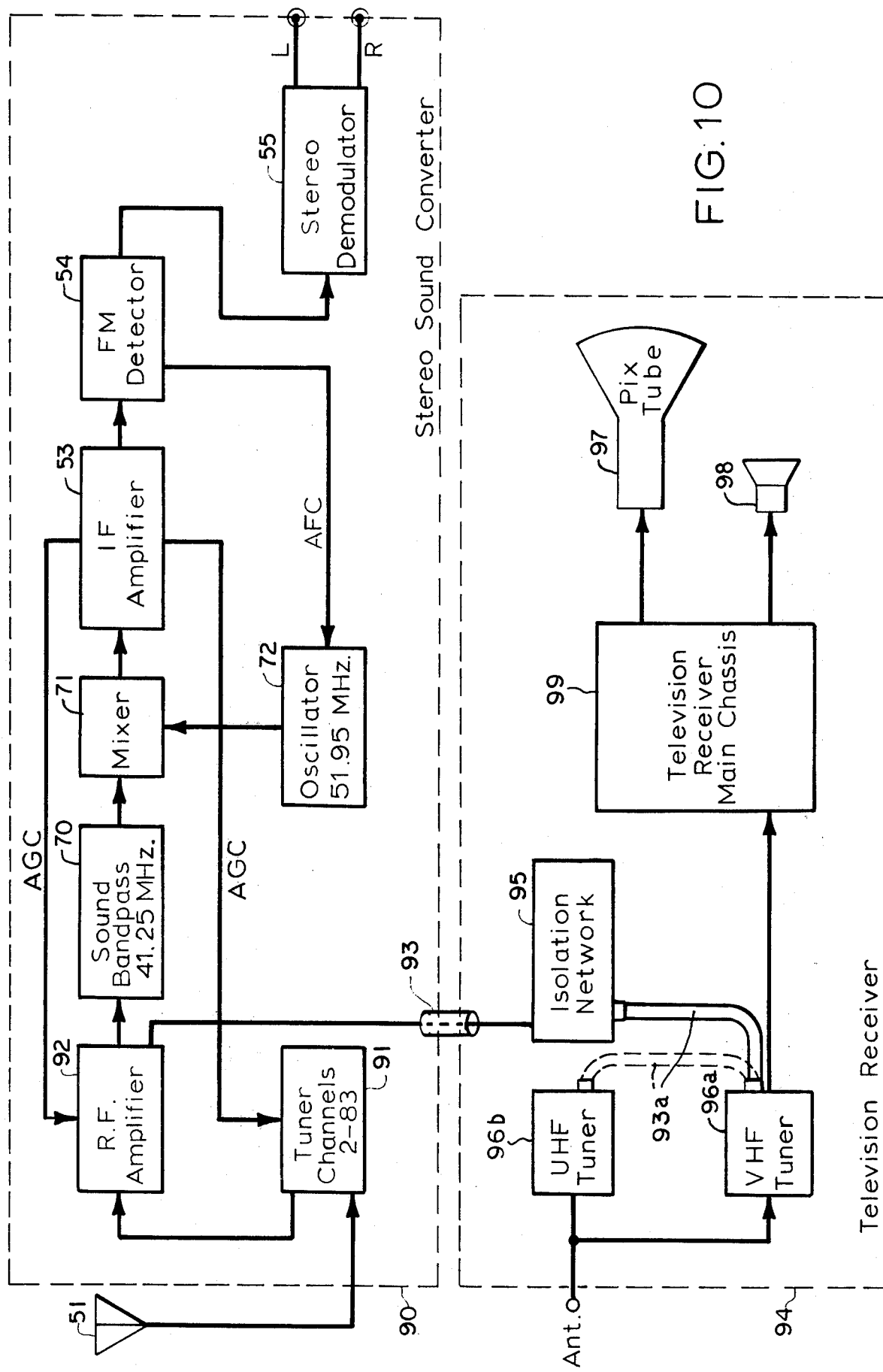
FIG. 10 is a functional block diagram of the stereophonic television sound adapter shown in FIG. 9.

For convenience, it may be desirable to perform channel selection at the converter for both the sound and video portions of a broadcast. To this end, the converter may take the form of an adapter 90 such as than shown in FIGS. 9 and 10. This adapter includes suitable RF circuitry for receiving both the audio and video portions of the signal, and for concurrently supplying the converted video IF signal to a conventional television receiver 94 to permit reproduction of the video scene. The adapter 90, which, except for an additional RF output circuit extending to the television receiver, may be similar in design and construction to the converter shown in FIG. 8, includes a tuner 92 for converting signals intercepted by the television receiving antenna 51 to an intermediate frequency. The intermediate frequency signals, corresponding to those commonly employed in a television receiver, i.e. 41.25 MHz for the sound carrier and 45.75 MHz for the video carrier, are amplified in an RF amplifier 92 and coupled through a coaxial cable 93 to the television receiver 94. Within the television receiver the coaxial cable 93 may terminate in an isolation network 95 which serves to couple the signals to UHF input of the VHF tuner 96a of the television receiver. The VHF tuner is coupled in a conventional manner to the main chassis 99 of the receiver, which may be conventional in all respects. The main chassis develops a video output signal for driving a picture tube 97.

The balance of the stereophonic sound converter 90 is similar in construction and operation to the converter shown in FIG. 8. As in the converter of FIG. 8, the 41.25 MHz output of RF amplifier 92 is applied through a 41.25 MHz bandpass filter 70 to the input of mixer stage 71. There, the IF signal is heterodyned with a continuous wave 51.95 MHz signal developed by an oscillator 72. As a result a 10.7 MHz IF signal is developed which is applied to the 10.7 MHz IF amplifier 53. The amplified IF output signal from this stage is applied to an FM detector 54 wherein a composite audio signal having L+R, L−R and pilot components is derived. The composite audio signal is applied to a stereo demodulator stage 55 wherein L and R audio signals are developed for application to external stereophonic amplifying equipment (not shown).

In operation, tuner 91, which may consist of a conventional turrent or bandswitch type discrete-channel tuner of the type commonly incorporated in consumer television receivers, is set to a desired channel and the intermediate frequency output from the tuner is routed through RF amplifier 92, cable 93 and isolation network 95 to the input of the television receiver VHF tuner 96a. This interconnection can usually be readily accomplished, since the VHF tuner 96a is ordinarily connected to the UHF tuner 96b by means of a coaxial cable 93a having plugs on at least one end, so that it is only necessary to unplug this cable and plug in the isolation network to complete the connection. The isolation network serves to isolate or decouple chassis grounds as well as to match impedances. VHF tuner 96a, when switched to its UHF position, serves only to pass the signal from the adapter 90 to the television main chassis 99.

Adapter 90 develops L and R audio signals while the television receiver 94 operates in a normal manner to product a picture on a picture tube 97. Since the operation of the television receiver has no effect upon the reception of the stereophonic sound signal, instability or poor signal quality within the receiver cannot depreciate the quality of the reproduced sound. The automatic gain control (AGC) circuits of the television receiver remain in effective control of video level with this arrangement, and while tuner 91 is adjusted to optimize picture quality in television receiver 94, the quality of the reproduced sound is automatically and independently optimized by AFC and AGC circuits of the adapter.

It will be appreciated that instead of the multichannel tuner, it is also possible to utilize a single-channel tuner for receiving a special interest channel. Obviously, this arrangement results in simplification and reduced manufacturing costs for the adapter, making the package attractive for promotional and special interest uses.

Figure 11:
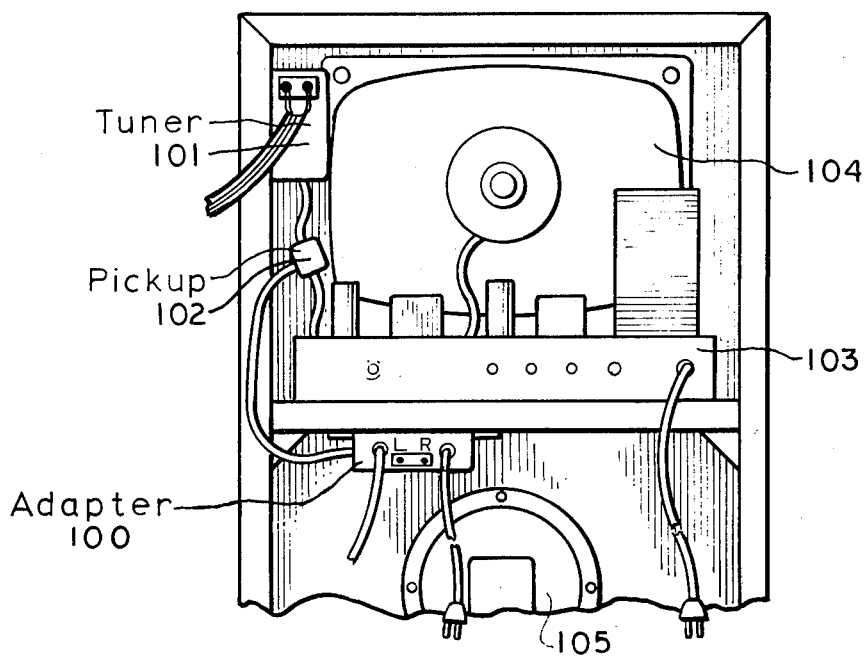
FIG. 11 is a rear elevational view of a television receiver and adapter for adapting the receiver to receive stereophonic television sound transmissions in accordance with the invention.
Figure 12:
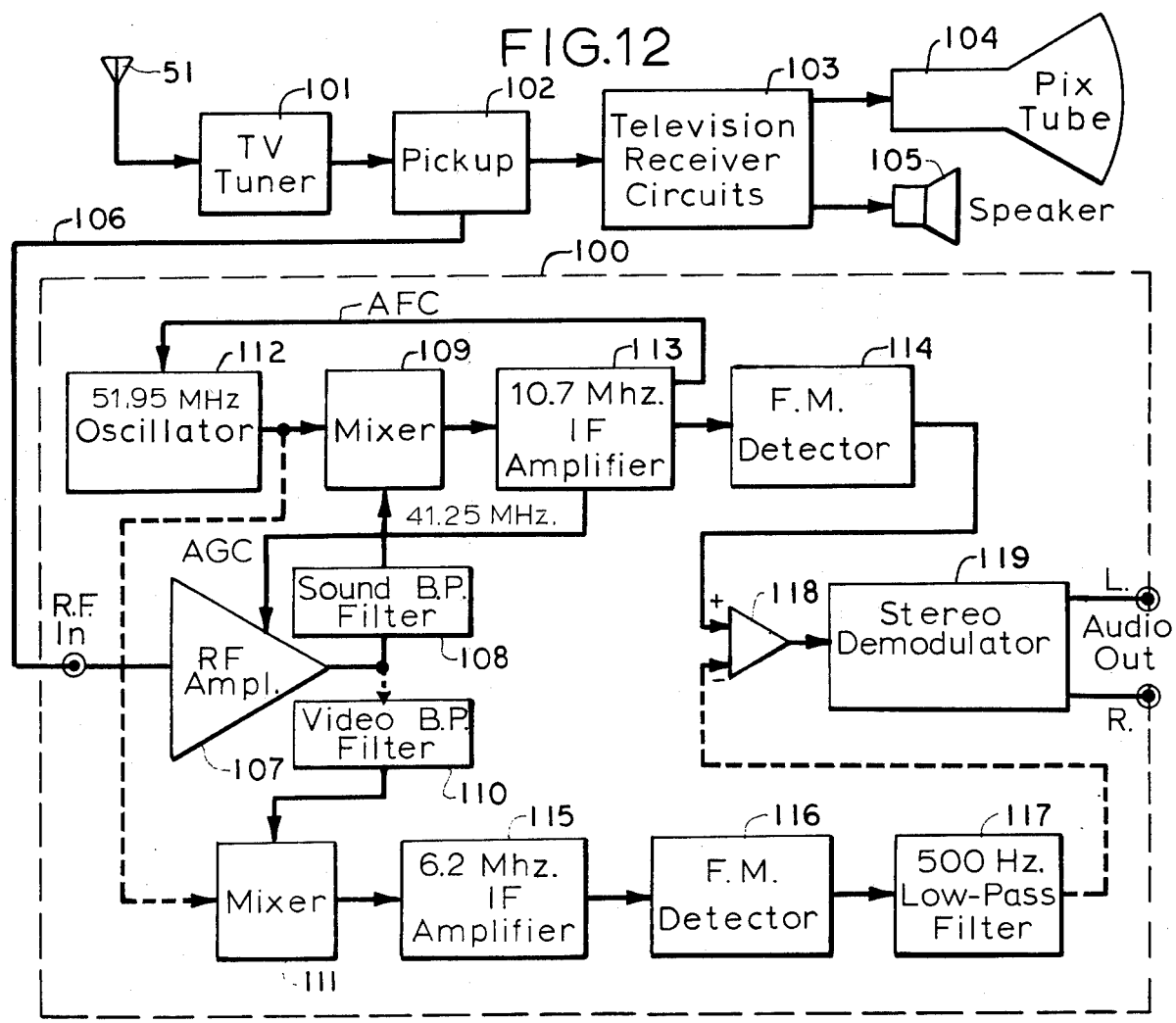
FIG. 12 is a functional block diagram of the stereophonic television sound adapter shown in FIG. 11.

A version of the stereophonic sound adapter for use in conjunction with a conventional television receiver, wherein channel selection is accomplished within the receiver, is shown in FIGS. 11 and 12. This arrangement allows the option of concealing the adapter 100 within the television receiver cabinet, as shown in FIG. 11. The television receiver, as shown in FIG. 12, may be conventional in design and construction, comprising a receiving antenna 51, a tuner 101, television receiver circuits 103, a picture tube 104, and a loudspeaker 105. To facilitate operation of the adapter the intermediate frequency output signal from tuner 101 is non-destructively sampled by a pick-up 102 and conveyed through a coaxial cable 106 to the input of a variable-gain RF amplifier 107. The pick-up 102 may consist of a high-impedance voltage pick-up coupled to the signal path, or alternatively a low-impedance current pick-up which may be inserted in series with the signal path by unplugging the existing cable between the tuner and the main chassis and plugging in the pick-up.

The output of RF amplifier 107 is applied through a 41.25 MHz sound bandpass filter 108 to a first mixing or heterodyning stage 109, wherein this signal is heterodyned with a 51.95 MHz continuous wave signal supplied by an oscillator 112 to develop a 10.7 MHz IF signal. As in the previously described converters, this signal is applied to a 10.7 MHz IF amplifier 113 wherein it is amplified and amplitude-limited, and from there to a conventional FM detector stage 114. The composite output signal from detector 114 is applied to the non-inverting input of a differential amplifier 118, whose output is in turn applied to a stereo demodulator stage 119 to develop L and R audio output signals for connection to an external stereophonic audio amplifier system.

To provide improved performance, an optional 45.75 MHz video bandpass filter 110 may be connected to the output of amplifier 107. The video signal passed by this filter is mixed in a second mixing or heterodyning stage 111 with the 51.95 MHz continuous wave signal developed by oscillator 112 to form a 6.2 MHz IF signal. The 6.2 MHz signal is amplified and amplitude-limited in a 6.2 MHz IF amplifier 115 and applied to a conventional FM detector stage 116 wherein an output signal indicative of frequency shift in the video channel is developed. The output signal is applied through a 500 Hz low-pass filter 117 to the inverting input of differential amplifier 118, causing the output of this amplifier to correspond to the difference between the composite signal from detector 114 and the low frequency signal from detector 116.

The effect of subtracting the low frequency audio component optionally derived from the 6.2 MHz IF signal is to cancel out some or all of the effects of any extraneous FM modulation which exists in the sound channel at the output of television receiver tuner 101 as a result of microphonics or AC power supply harmonics. The 6.2 MHz circuits are effective for this purpose because the video carrier is relatively free of frequency modulation components below 500 Hz, therefore any such frequency modulation finding its way into FM detector 116 is necessarily due to an undesirable effect common to both signal paths, and therefore should be cancelled out of the principal sound channel by differential amplifier 118.

Figure 13:
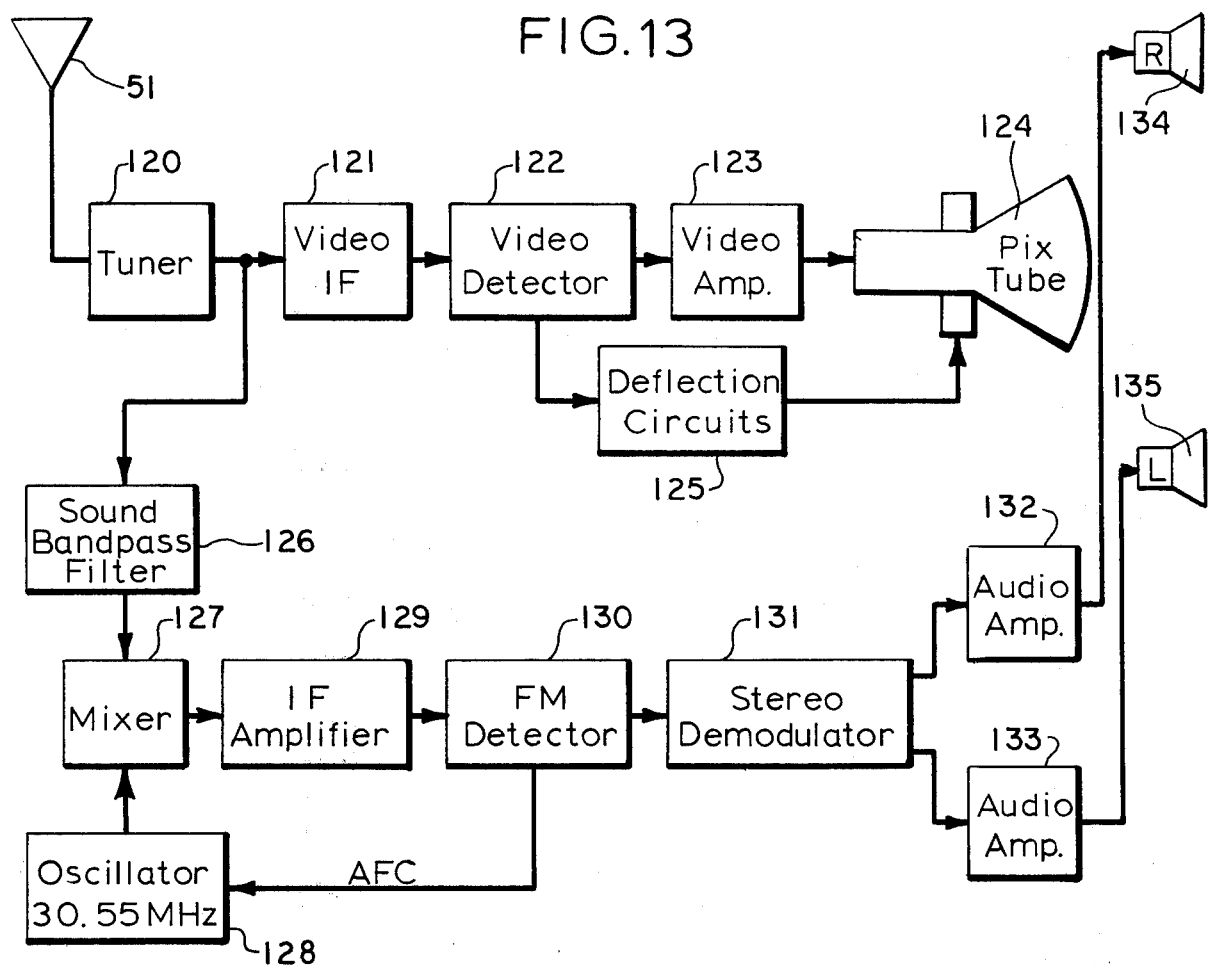
FIG. 13 is a functional block diagram of a television receiver incorporating means for receiving stereophonic television sound transmissions in accordance with the present invention.

The necessary circuitry for receiving stereophonic television sound broadcasts transmitted in accordance with the invention may also be provided as an integral part of a television receiver, as shown in FIG. 13. In the illustrated receiver, which except for its sound channel may be conventional in structure and operation, television transmissions are intercepted by an antenna 51, and amplified and converted by a conventional turner 120 to an intermediate frequency. The 45.75 MHz video portion of the IF signal is amplified by a 45.75 MHz video IF amplifier 121, and then applied to a video detector 122 wherein video information in the intercepted signal is derived. The video signal from detector 122 is amplified in a conventional video amplifier stage 123 and applied to a picture tube 124 to control the brightness of the electron beam thereon. The horizontal and vertical scanning of the electron beam is controlled by conventional deflection circuits 125 which receive synchronizing pulses from video detector 122.

The sound signal appears at the output of tuner 120 as a 41.25 MHz IF signal. This signal is separated from the 45.75 MHz video signal by a 41.25 MHz sound bandpass filter 126 and applied to a mixing or heterodyning stage 127. In mixing stage 127 the 41.25 MHz sound If signal is combined with a 30.55 MHz, or alternatively a 51.95 MHz, continuous wave signal from an oscillator 128 to develop a 10.7 MHz IF signal. This signal is amplified and amplitude limited in a 10.7 MHz IF amplifier stage 129 and applied to an FM detector 130 wherein a composite signal containing L+R, L−R and pilot components as depicted in FIG. 3 is developed. The composite signal is applied to a stereo demodulator 131 wherein L and R audio signals are developed. FM detector 130 also develops an AFC voltage which is applied to appropriate frequency control circuitry in oscillator stage 128 to maintain the 10.7 MHz IF signal centered in the IF channel regardless of the fine tuning of tuner 120.

The stereo demodulator 131, which contains both stereo demodulation and de-emphasis circuitry, such as those described in connection with the previously described stereophonic sound converters and adapters, reproduces from the composite signal the R and L audio signals developed at the program source. These audio signals are applied to respective inputs of audio amplifiers 132 and 133 wherein they are amplified to a level suitable for driving respective loudspeakers 134 and 135. Preferably, these spakers are located to the right and left of picture tube 124 as shown to provide a realistic stereo effect during viewing of the television receiver.

The sound channel of the television receiver is dual-conversion in design, the first conversion stage being contained in the tuner 120. For this application, with present technology, a single-conversion sound channel would be substantially inferior by reason of the high IF output frequency (41.25 MHz) of available television tuners, and the difficulty of building filters, amplitude-limiters, and FM detectors capable of operating at that frequency while meeting the stringent requirements of the IF amplifiers for high-fidelity stereophonic sound. Combined bandwidth, pass-band phaselinearity, and skirt attenuation design requirements are outside of practical technical and/or consumer market economic ranges, using present-day RLC, ceramic, and crystal filters, although it is contemplated that new filter technology may ultimately meet these filter requirements. Lowering the 41.25 MHz output frequency of modern television tuners is not an attractive alternative, since superior image rejection and adequate video channel bandwidth are important advantages of the higher IF frequency.

A dual-conversion sound channel retains the superior image-rejection advantage of the standard 41.25 MHz tuner output frequency, while simultaneously exploiting the advantages of a low second-conversion IF output frequency to achieve improved limiting and FM detection. Furthermore, a dual-conversion sound channel more effectively isolates the video and sound channels while independently optimizing both by means of AFC and AGC signals derived in the respective channels. It will be appreciated that frequencies other than 10.7 MHz may be utilized for the second IF channel for optimum performance, the principal advantage of the 10.7 MHz frequency being for the present the ready availability of 10.7 MHz IF amplifier components.

Figure 14:
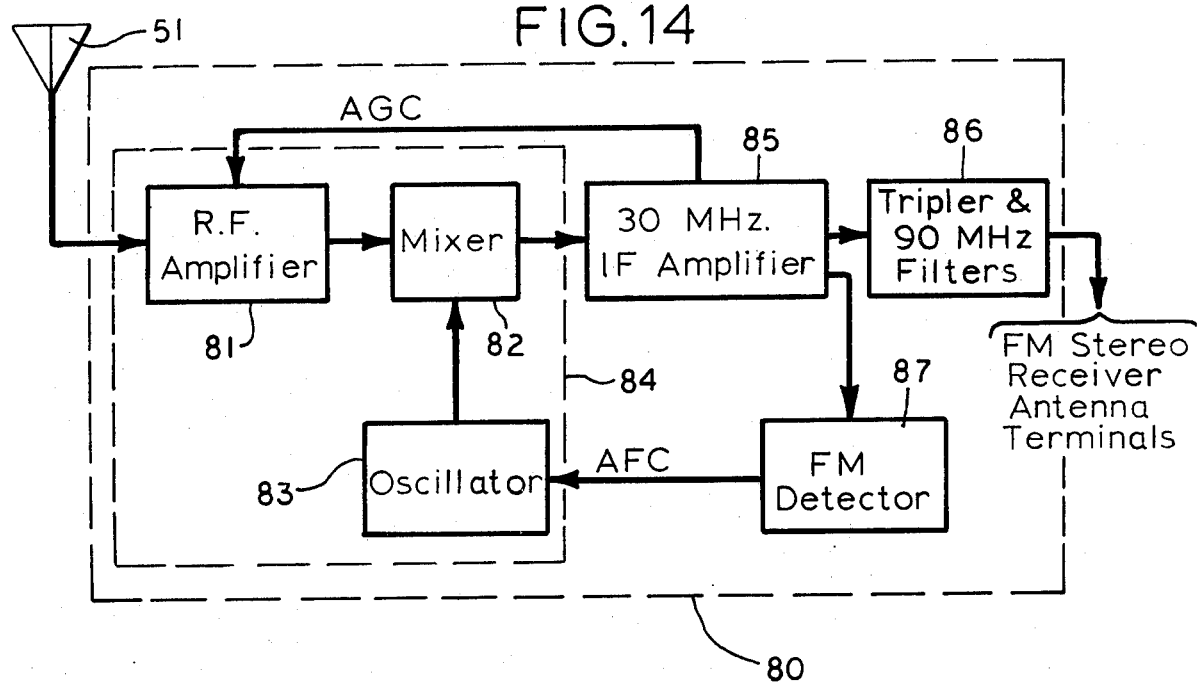
FIG. 14 is a functional block diagram of a converter for allowing reception of stereophonic television sound transmissions in accordance with the present invention on a standard stereophonic FM broadcast receiver.

In accordance with another aspect of the invention, stereophonic television sound signals transmitted in accordance with the invention can be received by a conventional FM stereo broadcast receiver by means of the adapter 80 shown in FIG. 14. The converter includes an RF ammplifier 81 to which the RF signal intercepted by the receiving antenna 51 is applied, and a mixer stage 82, wherein the amplified signal is heterodyned with a continuous wave output signal from an oscillator 83. The RF amplifier 81, mixer 82 and oscillator 83 together function as a tuner 84, the operating frequency of RF amplifier 81 being adjusted to the desired television broadcast channel and the frequency of oscillator 83 being adjusted to operate at a frequency removed from the television channel sound carrier such that the sound difference frequency, when tripled, falls within the 88–108 MHz FM broadcast band. In the illustrated embodiment this intermediate frequency is 30 MHz.

The intermediate frequency output signal from mixer 82 is applied to a 30 MHz IF amplifier stage 85 wherein it is amplified and amplitude-limited prior to being applied to a tripler and 90 MHz filter stage 86. To maintain the converter 80 centered on the desired channel the 30 MHz output signal from If amplifier stage 85 may be applied to an FM detector 87 to develop an AFC signal for application to oscillator 83. The output of tripler 86, which constitutes a stereophonic signal having modulation characteristics similar to those of a standard stereophonic FM broadcast signal, is applied to the antenna input terminal of a conventional FM stereo tuner (not shown). The output of the FM stereo tuner, which consists of L and R audio output signals, may be applied to a conventional stereo amplifier, and then to left and right loudspeakers which preferably are placed on either side of the television screen on which the video portion of the received broadcast is being viewed. A selector switch (not shown) may be included in the output circuitry of adapter 80 to facilitate connecting the FM tuner to an FM receiving antenna (not shown) when the adapter is not in use.

Since the frequency deviation of the third harmonic of the 30 MHz IF signal is three times the 25 KHz maximum deviation of the TV sound carrier, the 75 KHz maximum deviation prescribed for standard FM broadcasts is obtained in the resulting 90 MHz signal. For example, assuming reception of TV channel 11, the sound carrier of the received signal is located at 203.75 MHz and the video carrier is at 199.25 MHz. This dictates an oscillator frequency of 233.75 MHz, resulting in an intermediate frequency video carrier at 34.5 MHz and a sound carrier at 30 MHz. The 34.5 MHz video carrier is eliminated in the IF amplifier stage, leaving only the 30 MHz sound carrier for tripling to 90 MHz in tripler 86, and reception on FM broadcast channel 211 at 90 MHz. Since the pilot is, in accordance with the invention, established at 19 KHz the same demodulator circuits utilized in the tuner for demodulating standard FM broadcasts serve to demodulate the stereophonic television sound signal.

Filters for use in the 30 MHz IF amplifier 85 are within the practical design capabilities of recent surfacewave technology, and provide a particularly good application for a filter of (sin X/X) configuration. FM detection at the 30 MHz frequency is not a problem in this application, since that function is performed externally within the stereo tuner.

The technique of increasing frequency deviation by utilizing a harmonic of the desired signal provides the basis for improving the performance of the limitor and discriminator stages of an FM receiver. This is because increasing the frequency deviation of the modulated intermediate carrier effectively increases the level of the developed output signal. To illustrate application of this technique, the second conversion from 41.25 MHz to 10.7 MHz in the previously described television sound converter of FIG. 8 can be accomplished by selecting 46.60 MHz as the frequency of oscillator 72, thereby containing a difference frequency of 5.35 MHz at the output of mixer 71. The 10.7 MHz IF amplifier 53, being now tuned to the second harmonic of 5.35 MHz, provides twice the frequency deviation of the transmitted signal to the FM detector 54. The amplitude of the 10.7 MHz second harmonic thus extracted need not equal the amplitude of the 5.35 MHz fundamental to receive the full benefit of the increased deviation for maximum signal-to-noise improvement. All that is required is that it exceeds the minimum threshold level of IF amplifier 53 so that good limiting action is obtained. It should be obvious to those skilled in the art that by designing for other suitably lower difference frequency outputs from mixer 71, still higher order harmonics can be extracted by the 10.7 MHz IF amplifier, yielding proportionately increased frequency deviations.

In accordance with another aspect of the invention, the stereophonic television sound system of the invention can be utilized for bi-lingual programming. As shown in FIG. 15A, assuming that the sound portion of a television broadcast is to be broadcast simultaneously in two different languages A and B, the A sound source is connected through resistances 150 and 151 to the inverting inputs of first and second differential amplifiers 152 and 153, respectively. The B sound source is connected through a resistance 154 to the inverting input of amplifier 152 and through a resistance 155 to the non-inverting input of amplifier 153. The non-inverting inputs of amplifiers 152 and 153 are connected to ground by resistances 156 and 157, respectively, and the inverting inputs are connected to the outputs of their respective amplifiers by resistors 158 and 159, respectively. The outputs of amplifiers 152 and 153 are connected to the L and R audio inputs of the system stereo generator 147, which may be identical in construction and operation to the stereo generator 25 shown in FIG. 4.

As a result of this matrixing arrangement language B modulates what was formerly the 38 KHz L−R subcarrier channel, and language A modulates what was formerly the L+R main channel. The 19 MHz pilot component is transmitted as it was during the transmission of stereophonic program material.

At the receiver, as shown in FIG. 15B, and L and R audio outputs of the system stereo demodulator 148 are applied through respective resistances 160 and 161 to the inverting and non-inverting inputs of a differential amplifier 162. The output of amplifier 162 is coupled back to the inverting input terminal by a resistance 164 and the non-inverting input is connected to ground by a resistance 163. Resistances 160, 161, 163 and 164 form a matrix in combination with amplifier 162 to generate a signal corresponding to language B at the output of the amplifier. Language A can be obtained at either of the output terminals of the stereo demodulator 148 by conditioning the demodulator for monophonic operation. A three-pole three-position mode selection switch 165 may be provided to select the signal to be amplified by an external two channel audio amplifier 166 and applied to loudspeakers 167 and 168, and to condition the demodulator for monophonic operation during reception of language A.

With this arrangement, it is contemplated that language A would normally be the majority or domestic language, since the L+R channel on which it is conveyed is compatibly received by existing monaural television receivers. At the receiving end the matrixing circuitry can be constructed as an adapter 149 which can be readily added to or incorporated in existing receivers, such as those depicted in FIGS. 6 and 8, to enable selective reproduction of either language A or language B. It should also be noted that the bi-lingual system can also be used in conjunction with standard FM stereo broadcasts. In this case the adapter 149 is connected between the L and R audio outputs of the stereo FM receiver and the stereo amplifying system.

From the preceding discussion it will be realized that the basic stereophonic television sound transmission system contemplated by this invention requires only the addition of a stereo FM multiplex generator to existing television sound transmission equipment, and the addition of a converter or adapter to existing television receiving equipment. However, by modifying certain parameters of the heretofore described system in accordance with further aspects of the invention to be subsequently described, improved sound transmission is possible in conjunction with such existing equipment. Such modifications are feasible at this time since commercial stereophonic television broadcasts are presently nonexistent, and engineering standards concerning such broadcasts have not been established. Therefore, in anticipation of, and as a basis for establishing such standards, it is appropriate to examine the characteristics of the modulated sound carrier generated by the transmission system in detail to determine what standards provide for optimum transmission of stereophonic sound without detriment to picture quality.

Referring to FIG. 3, the maximum frequency deviation of either L−R component is 50% that of the L+R main channel component, this reduction being the result of the L−R energy being spread over two sidebands which span twice the bandwidth of the main channel. This has the effect of reducing the modulation indices of the L−R channel relative to the main channel. Moreover, the L−R channel modulation indices are further reduced by the well known 1/f decrease of the modulation index with increasing modulation frequency. This is graphically illustrated in logarithmic format by FIG. 16, wherein Curve A is a plot of modulation index vs. modulation frequency (measured from the sound carrier) for the condition of constant maximum frequency deviation (22.5 KHz). Curve B is a similar plot, except that, in accordance with the above-mentioned maximum frequency deviation limits of FIG. 3, the modulation indices of the L−R channel are depressed 50% (6 db.), while the L+R region remains identical to Curve A.

Modulation index curve B represents modulation at the 100% level for the proposed transmission system based upon a uniform audio spectral energy distribution. In practice the distribution of energy peaks in audio program material falls off with increasing frequency. This is shown by Curve C, wherein only lower frequency peaks attain the 100% modulation level of curve B. The form of curve C is actually that of a de-emphasis network having a time constant of 25 microseconds, that curve having been found to best approximate the energy distribution in modern audio programs as shown by Ray M. Dolby, *Optimum Use of Noise Reduction in FM Broadcasting,* Journal of the Audio Engineering Society, Vol. 21, No. 5, June 1973, and D. P. Robinson, *Dolby B-Type Noise Reduction for FM Broadcasts,* Journal of the Audio Engineering Society, Vol. 21, No. 5, June 1973. These references demonstrate that the conventional 75 microsecond time constant presently prescribed by U.S. FM radio standards is outmoded, being based on the frequency distribution of program material as it existed at an earlier time using equipment and methods which are now obsolete.

Referring again to FIG. 16, curves X and Y depict the effect on frequency response of pre-emphasis networks having respective time constants of 75 and 25 microseconds in the L+R region, the L−R region having been omitted for reasons of clarity. Curve D illustrates the effect of a 75 microsecond pre-emphasis network on modern program material (as represented by curve C). Curve D is obtained by subtracting curve C from curve X, with curve B as the baseline. Over-modulation is that portion of curve D which exceeds the 100% modulation line (curve B), being prominent at high audio modulation frequencies of both the L+R and L−R bands.

It can be concluded from curve D that the result of applying the 75 microsecond pre-emphasis required by U.S. standards in present-day FM broadcasting has been overcompensation of the high frequencies, requiring either amplitude limiting of high frequencies, or substantial under-modulating of mid and low frequencies to avoid over-modulation of the transmitter. The penalty in the first instance is diminished high frequency response when the program material is de-emphasized prior to reproduction at the receiver. The penalty in the latter instance is reduced broadcast coverage.

Figure 16:
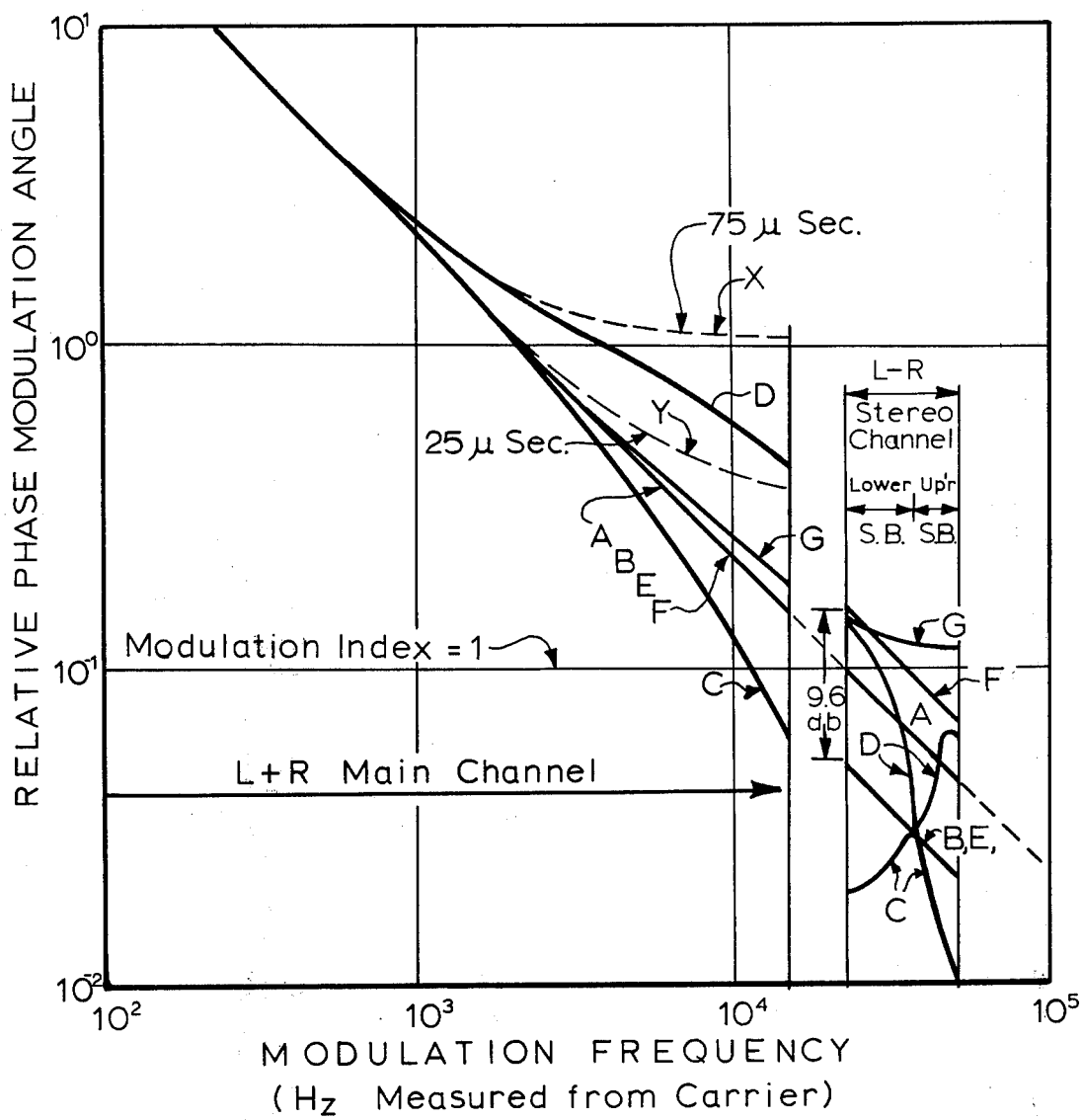
FIG. 16 is a graphic presentation of various transmission standards as applicable to a stereophonic television sound transmission system constructed in accordance with the invention.

In interpreting curve D it should be considered that the ordinate in FIG. 16 is the phase modulation angle of the sound carrier, which may be taken as an indication of tolerance by the transmitted signal to noise interference along the transmitter-receiver radiation path. Curve D reveals that, when 75 microsecond pre-emphasis is applied, the overall noise tolerance of the L−R sidebands is substantially inferior to that of the main channel, the modulation frequencies in the region of 38 KHz being particularly deficient. This latter deficiency, together with over-modulation of high audio frequencies, are present-day problems of FM stereo broadcasting.

If 75 microsecond pre-emphasis were to be adopted as a standard for stereophonic television sound, the problem of L−R noise susceptibility would be more serious than is presently the case for FM stereo broadcasts, since FM broadcast standards specify 75 KHz as the maximum frequency deviation, whereas the corresponding maximum specified for television sound transmission is only 25 KHz. For comparison, curve E, which results from subtracting curve C from curve Y, with curve B as the baseline, shows the effect of applying 25 microsecond pre-emphasis to the representative program content of curve C. It will be noted that curve E coincides at all frequencies with curve B, which can be interpreted as indicating that, with 25 microsecond pre-emphasis, the program can be transmitted with essentially 100% modulation at all frequencies. It is also apparent that adopting 25 microsecond pre-emphasis eliminates the 38 KHz-centered noise tolerance deficiency and high frequency over-modulation characteristics of 75 microsecond pre-emphasis. However, the overall L−R noise susceptibility (relative to that of the L+R main channel) remains low, as evidenced by the 9.6 db drop between the low point (15 KHz) of the L+R channel and the high point (23 KHz) of the L−R channel, as shown in FIG. 16.

One way to increase L−R noise tolerance is shown by curve F, wherein L−R signal amplitude has been increased by a factor of 3 (9.6 db) relative to curve E, while the L+R channel amplitude remains unchanged. Another way to improve L−R noise susceptibility is illustrated by curve G, which results from first enhancing the L−R portion of curve E by a factor of 2 (6 db), 7.5 microsecond preemphasis to the overall stereo composite signal. This raises the relative modulation level of the stereo channel and adjusts the slope to increase the relative signal strength at the high frequency end of the L−R spectrum. Since preemphasis having a 7.5 microsecond time constant has its greatest effect above approximately 20 KHz, its effect on the L+R main channel is minimal.

Thus, in accordance with further aspects of the invention, the basic transmission system of the invention may be significantly improved with respect to sound fidelity, broadcast coverage, and signal-to-noise ratio of the L−R channel, by 1) employing an audio pre-emphasis time constant of 25 microseconds rather than the 75 microsecond time constant required by the present FM and TV broadcast standards, 2) enhancing only the L−R component of the composite stereo signal, while maintaining the L+R main channel unchanged, and 3) applying additional pre-emphasis to the composite signal in combination with selective enhancement of the L−R region to adjust or eliminate, as desired, the negative slope of the L−R spectrum.

FIG. 17A shows circuitry for enhancing the amplitude of the L−R channel without affecting the L+R main channel, thereby achieving the improved signal-to-noise performance characteristic of curve F in FIG. 16. In this further aspect of the invention, additional circuitry 140 is interposed between the L and R program sound sources and the L and R audio inputs of the stereo multiplex generator 25 at the studio. Alternatively, this additional circuitry could be incorporated within the multiplex generator itself, the internal pre-emphasis circuits of which may be converted to a 25 microsecond time constant. At the receiver additional circuitry 141, which compensates for the effect of the transmitter circuitry 140, is added as shown in FIG. 17B. The receiver compensating circuitry 141 may be a simple adapter connected between the L and R audio output terminals of the receiver and the corresponding inputs of an external stereo amplifier/speaker system, or may be incorporated within the stereo demodulator 55 of the receiver.

The enhancement circuit shown in FIG. 17A utilizes two differential amplifiers 142 and 142. Amplifier 142 has its non-inverting input connected to the L sound source and amplifier 143 has its non-inverting input connected to the R sound source. The output of amplifier 142, henceforth designated L', is connected to the left audio input of the multiplex generator 25, and by an impedance $Z_a$ to its inverting input. The output of amplifier 143, henceforth designated R', is similarly connected to the right audio input of the multiplex generator 25 and by an impedance Zb to its inverting input. The inverting inputs of amplifiers 142 and 143 are interconnected by an impedance Zc.

If the three impedances are arranged to be resistive and of equal value ($Za = Zb = Zc$), the L−R audio amplitude increases by a factor of 3, while the L+R audio amplitude remains unchanged. This follows since $$L' = 2L - R \qquad R' = 2R - L$$

$$\text{and } \frac{L' + R'}{L + R} = 1 \qquad \text{and } \frac{L' - R'}{L - R} = 3$$

The relationship is shown in the following tabulation for various input combinations wherein each unit corresponds to an 11.25 KHz deviation:

TABLE 1

| L | R | L' | R' | L+R | L'+R' | L−R | L'−R' |
|---|---|----|----|-----|-------|-----|-------|
| 1 | 1 | 1  | 1  | 2   | 2     | 0   | 0     |
| 1 | −1| 3  | −3 | 0   | 0     | 2   | 6     |
| 1 | 0 | 2  | −1 | 1   | 1     | 1   | 3     |
| 0 | 1 | −1 | 2  | 1   | 1     | −1  | −3    |

As shown in FIG. 17B, a compensating circuit 141 consisting of three impedances $Za'$, $Zb'$, and $Zc'$ and a pair of audio amplifiers 144 and 145 may be provided at the receiver to restore the l and R audio signals to the amplitude relationship they had prior to the L−R enhancement introduced at the transmitter. The L' audio output signal from demodulator 55 is coupled to the input of audio amplifier 144 by impedance $Za'$ and the R' audio output signal from the demodulator is coupled by impedance $Zb'$ to the input of audio amplifier 145. The inputs of amplifiers 144 and 145 are connected together by impedance $Zc'$. As in the previously described embodiments, the composite signal developed within the converter or adapter is applied to demodulator 55.

If, as illustrated above, Za, Zb, and Zc are made equal and resistive in the enhancement circuit, $Za'$, $Zb'$, and $Zc'$ will also necessarily be equal and resistive, although they need not have the same absolute resistance as Za, Zb and Zc. With this arrangement the L and R audio output signals at the receiver will be restored to the same amplitude relationship they had prior to L−R enhancement at the transmitter.

Although the 9.6 db (factor of 3) enhancement of the L−R channel has been shown and discussed, it will be appreciated that by selecting other values for Zb, Zb, and Zc at the studio, a greater or lesser enhancement of the L−R component can be achieved. For example, for the factor of 2 (6 db) enhancement illustrated by curve G of FIG. 16, it is necessary that $R_L = 2R_b = 2R_a$ with the result that $$L' = \frac{3L - R}{2} \qquad R' = \frac{3R - L}{2}$$

$$\text{and } \frac{L' + R'}{L + R} = 1 \qquad \text{and } \frac{L' - R'}{L - R} = 2$$

Figure 18A:
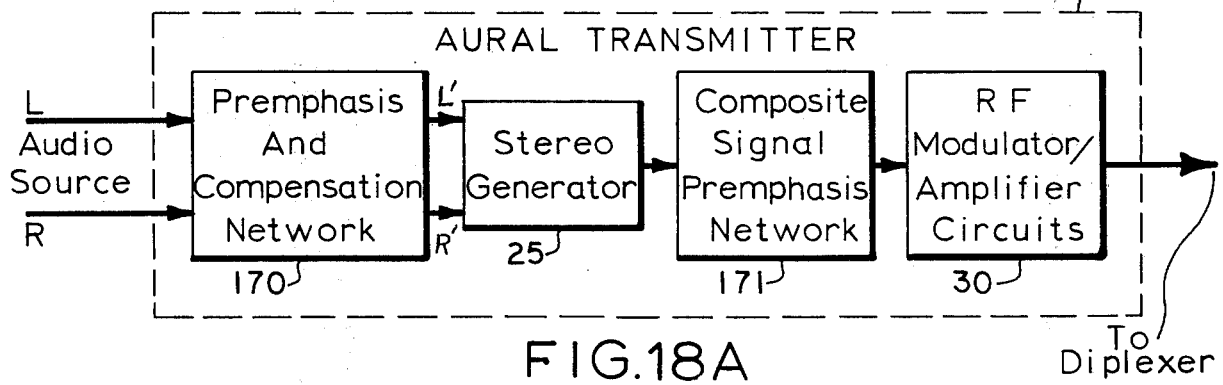
FIG. 18A is a functional block diagram of the transmitter portion of the stereophonic television sound transmission system of the invention incorporating means for L−R component enhancement for improved performance.

As described earlier, curve G results from the combination of a 6 db enhancement, with a 25 microsecond audio pre-emphasis then applied prior to multiplexing, followed by an additional pre-emphasis applied to the composite stereo signal after multiplexing. As shown in FIG. 18A the enhancement and audio pre-emphasis may be accomplished by means of a circuit 170 situated ahead of the system stereo multiplex generator 25 (assuming no pre-emphasis within the generator), while a pre-emphasis network 171 for the composite signal may be located between the multiplex generator and the transmitter modulator/amplifier circuits 30. For curve G the composite signal pre-emphasis time constant is 7.5 microseconds.

Figure 18B:
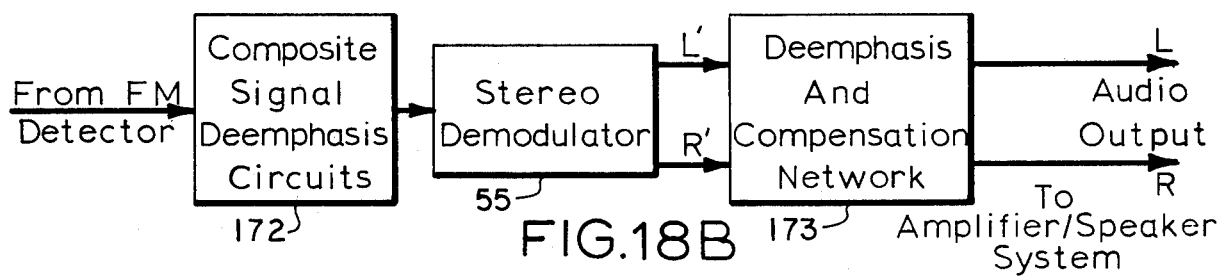
FIG. 18B is a functional block diagram of the receiver portion of the stereophonic television sound transmission system of the invention incorporating means for compensating for L−R component enhancement.

Referring to FIG. 18B, to compensate at the receiver for the pre-emphasis of the composite signal introduced at the transmitter, a 7.5 microsecond de-emphasis network 172 may be incorporated ahead of the demodulator 55. Audio de-emphasis and the earlier described audio de-enhancement circuits of the receiver may be incorporated in a circuit 173 at the output of demodulator 55.

It will be appreciated that the composite signal conditions represented by curves F and G of FIG. 16 have been presented as a means of illustrating various techniques which may be combined in various degrees to shape the composite signal spectrum so as to optimize stereophonic performance. It is anticipated that such techniques would ultimately be defined as parameters in a yet to be adopted stereophonic television sound standard.

It should be understood that the curves of FIG. 16 are idealizations, in that they represent the case for sinusoidal signals of prescribed amplitude plotted one frequency at a time. By contrast, audio programs originate as complex signals of constantly changing amplitude and frequency. Modulation envelopes of complex signals tend to blend as a continuum and to thereby obscure details of the underlying signals such as the 8 KHz gap which separates the L+R and L−R components in FIG. 16. For this reason, observed complex signal modulated spectra for the stereophonic television sound transmission system appear somewhat as shown in the expanded television sound channel portrayed in FIG. 5. Referring to that figure, modulation of the sound carrier with a composite signal, such as developed in the basic (non-enhanced) transmission system of this invention, results in the generation of an RF signal 180 at the upper end of the television channel (FIG. 2) having a maximum overall bandwidth of 50 KHz during monophonic (L+R only) transmission, and an RF signal 181 having a maximum overall bandwidth of 106 KHz during stereophonic transmissions. Modulation of the sound carrier 26 with the composite signal developed when the basic transmission system has been modified to incorporate the circuitry of FIG. 17A, so as to provide 9.6 db enhancement of the L−R component, results in generation of an RF signal 182 having shoulders above those of the envelope of RF signal 181.

The conditions depicted in FIGS. 3 and 16 represent extreme modulation limits for the L+R and L−R components, those limits being mutually exclusive in the sense of being attainable in only one channel at a time, and only under the uncommon circumstance that the other channel equates to 0 at that instant. For this reason, most of the audio content of the program is developed at levels below these limits, being susceptible therefore to environmental electrical noise to a still greater degree. One way to further improve noise rejection for the low level signals is to process the program content before transmission in a manner that raises the average modulation of the composite signal closer to 100%, and to then compensate at the receiver with reciprocally matched circuitry to restore the original conditions. One such system, the Dolby Type B noise reduction system, is finding increasing commercial application in FM stereophonic radio broadcasting for reducing high frequency over-modulation and raising the average modulation level of the transmitted program.

Basically, the transfer characteristic of the Dolby B system is such as to enhance low-level high frequency signals, the degree of low level enhancement increasing as a function of frequency. Since the Dolby B system has been detailed prominently in the literature, only the relevant, qualitative features are noted herein. These are summarized in Table 2, wherein various configurations, consisting of various transmission pre-emphasis and reception de-emphasis time constants are compared with and without Dolby Type B transmission and reception units with respect to maximum modulation level for high fidelity transmission (0 db = 100% modulation), high fidelity capability, and relative signal-to-noise performance.

TABLE 2

| System No. | Configuration Transmitter Pre-Emphasis* | Receiver De-Emphasis* | Maximum Relative Modulation Level | | High Fidelity | Net Relative S/N |
|---|---|---|---|---|---|---|
| 1 | 75 | 75 | −8.3 | db | Yes | −0.9 db |
| 2 | 25 | 75 | 0 | db | No | <2.7 db |
| 3 | 25 | 25 | 0 | db | Yes | +2.7 db |
| 4 | Dolby & 75 | 75 | −8.3 | db | No | — |
| 5 | Dolby & 25 | 75 | 0 | db | No | — |
| 6 | Dolby & 25 | 25 | 0 | db | No | — |
| 7 | Dolby & 25 | 25 & Dolby | 0 | db | Yes | +12.3 db |

* = microseconds

As can be seen in Table 2, the configurations are listed in order of increasing signal-to-noise (S/N) ratio, although, for configurations 4, 5 and 6 the improvement has dubious merit, since the result is distortion of the audio signal due to over-emphasis of high frequencies. Only configurations 1, 3, and 7, for which the de-emphasis is truly complementary, are capable of high fidelity reproduction; and of these, only configurations 3 and 7 can transmit all of the program material at essentially full modulation. Configuration 3 was described earlier as the preferred 25 microsecond pre-emphasis/de-emphasis system for the basic transmission/reception system of the invention. Configuration 7, which incorporates complementary Dolby noise-reduction, may be implemented in the system of configuration 3 without modification, resulting in a 13.2 db S/N improvement as compared with the complementary 75 microsecond pre-emphasis standard for FM broadcasts. Furthermore, without system modification, Dolby Type B noise reduction may be combined with the previously described L−R enhancement and composite signal pre-emphasis techniques for further noise reduction to the extent permitted by whatever frequency deviation limits are ultimately adopted as a standard for stereophonic television sound transmissions.

Figure 19A:
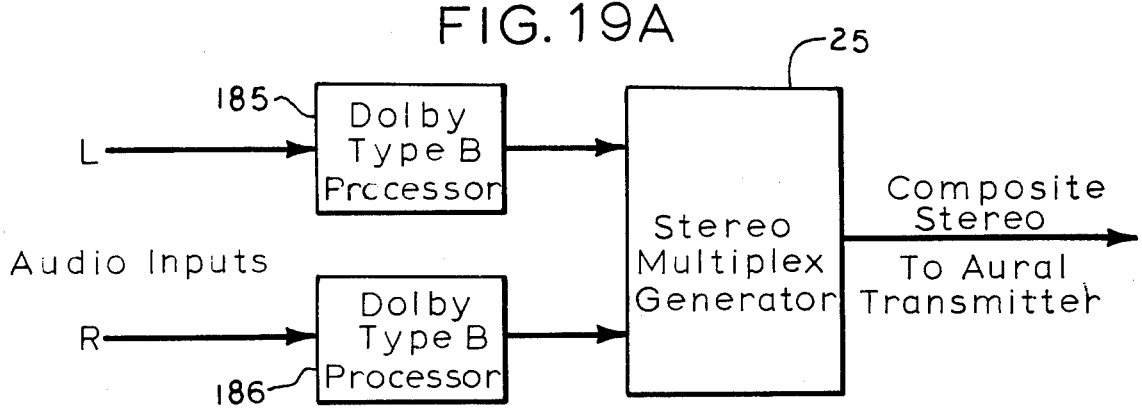
FIG. 19A is a functional block diagram of the transmitter portion of the stereophonic television sound transmission system of the invention showing means for Dolby type B encoding incorporated therein.
Figure 19B:
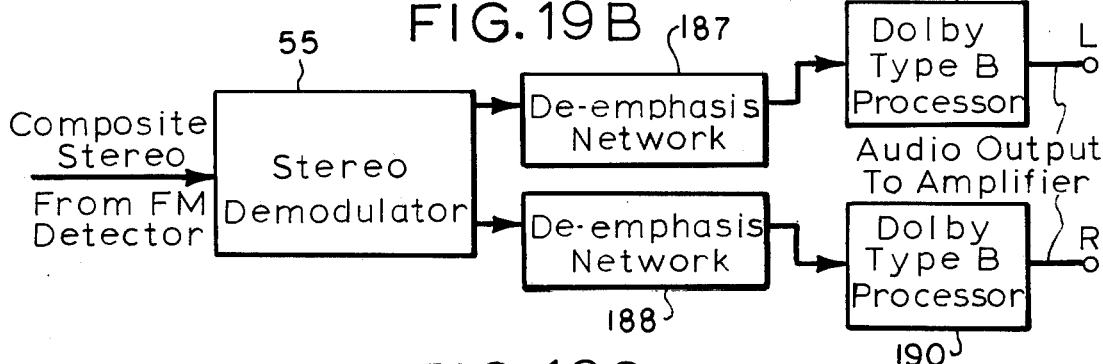
FIG. 19B is a functional block diagram of the receiver portion of the stereophonic television sound transmission system of the invention showing means for Dolby type B decoding incorporated therein.

FIG. 19A shows the application of Dolby Type B noise reduction to the basic transmission system of the invention, wherein two Dolby B processors 185 and 186 at the transmitter encode the pre-emphasized L and R audio signals prior to application to the system stereo generator 25. At the receiver, as shown in FIG. 19B, the L and R audio outputs of the receiver stereo demodulator stage 55 are applied through respective de-emphasis networks 187 and 188, which in accordance with the previous discussion have a time constant of 25 microseconds, to respective Dolby B processors 189 and 190, which decode the L and R audio signals. The de-emphasis networks and processors together provide compensation to restore the de-emphasized L and R audio signals from demodulator 55 to their original relationship.

Figure 19C:
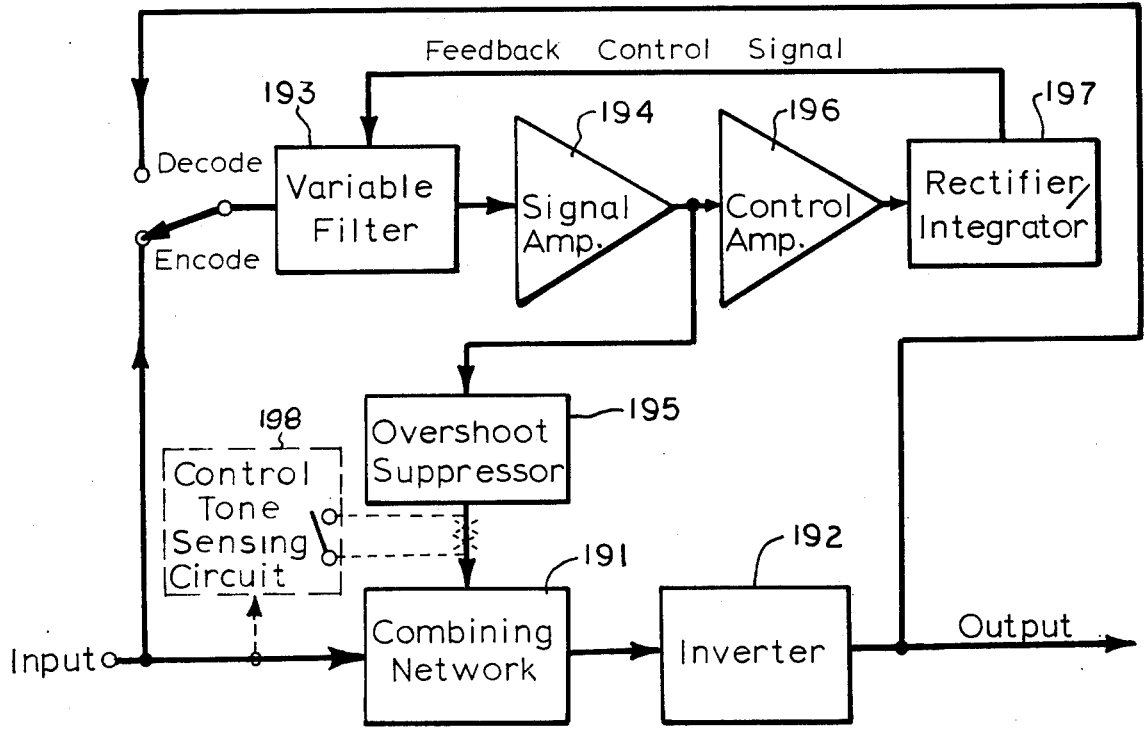
FIG. 19C is a functional block diagram of a Dolby type B signal processing stage suitable for use in the stereophonic television sound transmission system of the invention.

The encoding and decoding processors may be basically identical in construction, differing only in the manner in which the input signal is routed, as shown in FIG. 19C. The input signal traverses two paths; a main path through a combining network 191 and an inverter 192, and a secondary path through a voltage-responsive variable-frequency filter 193, a signal amplifier 194, and an overshoot suppressor 195. The main path passes the input signal essentially unchanged. The secondary path is essentially a filter which passes only low-level, high-frequency components of the input signal. During encoding, the output of the secondary path is added to the main path, boosting the low-level, high-frequency portions of the input signal. During decoding, the output of the secondary path is subtracted from the main signal path output, a result of the secondary path input being sensed as the inverted output of the processor. Decoding thus removes the same information to the same degree as was inserted during encoding.

The characteristics of the secondary path variable filter 193 are determined by a feedback loop consisting of a control amplifier 196 and rectifier/integrator 197. For signal amplitudes which do not exceed a fixed threshold, no feedback signal is generated, and the transfer function of the filter is simply that of a fixed, 500 Hz high pass filter. The threshold level is fixed at approximately 40 db below Dolby level, an internationally standardized reference corresponding to a frequency deviation of ± 37.5 KHz for FM broadcasting. A similar reference would be established for television sound at 50% of the maximum frequency deviation allowed for the television sound carrier. The gain of control amplifier 196 is a non-linear function of frequency, so that as signal amplitudes increase above the threshold level negative feedback raises the variable filter cut-off frequency in a non-linear manner, reaching a constant, maximally restricted bandwidth for input signals near Dolby level. The overall effect is negligible at low frequencies and at levels approaching full modulation, but increases with increasing frequency and decreasing amplitude.

In another embodiment of the invention, enhancement of low level signals is accomplished in a manner similar to that of the Dolby Type B system, in that the degree of enhancement also increases as a function of frequency. However, unlike Dolby Type B, enhancement of low level signals occurs only above 20 KHz, and is applied to the composite signal, being provided immediately following the system stereo multiplex generator 25, as with the pre-emphasis network 171 provided for the composite signal in FIG. 18A. Complementary circuitry is installed at the receiver just prior to the stereo demodulator 55, as with the composite signal de-emphasis circuits 172 in FIG. 18B. Applied in this way, only the L−R channel is affected, the effect being to raise the modulation level (and hence the noise tolerance) of low level L−R signals without increasing the modulation level of high-level signals.

Since neither commercial stereophonic television broadcasts nor suitable commercial receivers for receiving such broadcasts are in existence, no problem of obsolescence of existing equipment exists in adopting the proposed compatible transmission system. Receivers or adapters to reproduce television stereophonic sound in accordance with the transmission/reception system of the invention may be manufactured with the preferred 25 microsecond time constant, and may in fact immediately incorporate Dolby Type B reception circuitry, since such circuitry is already commercially available in economical IC packaging. As for compatibility with existing monophonic television receivers which have 75 microsecond sound de-emphasis, it is doubtful that any unfavorable change in the reproduced sound signal could be perceived, since very few television receivers are capable of high fidelity reception. At any rate, FM broadcasts using the previously discussed configuration 5 system indicate that many monophonic TV listeners would actually perceive the sound quality as improved because of its increased high frequency content.

To better enable Dolby-B processor-equipped receivers to receive non-Dolby transmissions a remote switching signal may be added to the composite signal to control the decoding processors within the receivers. This switching signal may take the form of a sub-sonic fixed frequency signal in the 10 to 25 Hz range which may be selectively added to either the composite signal output of the stereo generator 25 (FIG. 1) or generated within the stereo generator whenever the transmission includes Dolby-B processing. The subsonic tone would be detected by a control tone sensing circuit 198 (FIG. 19c) in the receiver and utilized to control the Dolby-B processing stage(s) therein.

For example, a subsonic 20 Hz signal could be generated at a fixed amplitude corresponding to 25 Hz frequency deviation of the sound carrier. The corresponding modulation index (1.25) of this inaudible component would be 60 db below the 100% modulation level (25 KHz), being therefore innocuous to other intelligence and functions. At the receiver, a narrow-band frequency detector would respond to this 20 Hz component by generating a DC control signal suitable for switching or otherwise conditioning the receiver for Dolby-B decoding.

The above-described subsonic switching signal requires no additional bandwidth and, combined with the control possibilities of the 19 Khz pilot component constitutes a flexible means for conveying conditions of transmission. This is shown in Table 3 which illustrates the four transmission format conditions possible with the pilot and subsonic signals.

TABLE 3

| Control Signals | | |
|---|---|---|
| Pilot | Subsonic Signal | Transmission Format |
| Yes | No | Stereophonic, 25 Microsecond preemphasis |
| No | No | Monophonic, 75 Microsecond |

TABLE 3-continued

| Control Signals | | |
|---|---|---|
| Pilot | Subsonic Signal | Transmission Format |
| No | Yes | preemphasis Monophonic, Dolby, 25 Microsecond preemphasis |
| Yes | Yes | Stereophonic, Dolby with 25 Microsecond preemphasis |

It will be appreciated that more than one subsonic switching signal may be transmitted to accomplish control functions, and that the above-described subsonic switching technique is also applicable to conventional FM stereo broadcast transmissions.

The system of the present invention enables sterophonic sound to be broadcast over commerical television channels and faithfully and compatably reproduced in conjunction with conventional existing television receivers. The system requires a minimal amount of additional transmitting equipment and minimal modification of existing receiving equipment. With modification the system may also provide for compatable broadcast and reception of bilingual television programming.

Television sound transmissions in accordance with the invention may be received on converters, either of the type wherein channel selection is accomplished independently of the associated television receiver on which video information is being reproduced, or by means of the tuner contained in the receiver. Such converter may provide a low level audio signal for amplification on an external stereo amplifier/speaker system, or may provide high level audio and/or speakers for direct sound reproduction. A variation of the converter allows reception by means of a conventional stereo FM broadcast receiver. Alternatively, adapter may be integrally installed in existing or newly constructed television receivers to achieve stereophonic sound reception.

Improvements in the signal-to-noise ratio of the basic transmission system are possible by 1. Adopting a 25 microsecond preemphasis/deemphasis time constant,
2. Enhancing the L−R component of the composite signal,
3. Applying preemphasis and deemphasis to the composite signal,
4. Applying Dolby Type-B signal processing to the L and R audio signals, and/or
5. Applying Dolby Type-B signal processing to the L−R component of the composite signal. Further improvement is contemplated by selecting a pilot component having a frequency equal to 5/4 $F_H$ to reduce the number of audible interference bands which result from horizontal scanning frequency harmonics within the L−R component sidebands.

I claim:
1. A stereophonic sound transmission system for transmitting within a television broadcast channel having defined frequency limits left and right audio source signals and a video source signal each having a predetermined upper frequency limit, said video source signal being amplitude-modulated on a video carrier to form an AM signal occupying a first portion of said channel, said system comprising, in combination:
generator means including a stereo multiplex generator for generating a composite signal including a first component representative of the sum of said left and right source signals, a second amplitude-modulated subcarrier component representative of the difference between said left and right signals, said subcarrier component having upper and lower sidebands centered about a suppressed subcarrier, and a pilot component having a frequency one-half the frequency of said suppressed subcarrier;

transmitter means including means for generating a sound carrier within said broadcast channel, and means for frequency-modulating said sound carrier with said composite signal to form an FM signal occupying a second portion of said channel;

receiver means for receiving said television broadcast channel including means for deriving said composite signal; and demodulator means for developing said left and right audio source signals from said composite signal.

2. A stereophonic sound transmission system as defined in claim 1 wherein said sound carrier is spaced by 4.5 MHz from said video carrier.

3. A stereophonic sound transmission system as defined in claim 1 wherein said second component of said composite signal is spaced from said sound carrier by at least twice the maximum upper frequency limit of said audio source signals.

4. A stereophonic sound transmission system as defined in claim 3 wherein said upper limit of said left and right audio source signals is approximately 15 KHz, the frequency of said suppressed subcarrier is 38 KHz, the frequency of said pilot component is 19 KHz.

5. A stereophonic sound transmission system as defined in claim 1 wherein said video source signal has a predetermined horizontal scanning frequency, the frequency of said pilot component is 5/4 said horizontal scanning frequency, and the frequency of said subcarrier is twice the frequency of said pilot component.

6. A stereophonic sound transmission system as defined in claim 1 wherein said upper and lower sidebands each cause a maximum frequency deviation to said frequency-modulated carrier equal to one-half the maximum deviation caused by said first component.

7. A stereophonic sound transmission system as defined in claim 6 wherein said first component causes a maximum frequency deviation of 22.5 KHz to said frequency-modulated sound carrier and said upper and lower sidebands of said second component each cause a maximum frequency deviation of 11.25 KHz to said sound carrier.

8. A stereophonic sound transmission system as defined in claim 7 wherein said pilot component causes a maximum deviation of 2.5 KHz to said frequency-modulated carrier.

9. A stereophonic sound transmission system as defined in claim 1 wherein said multiplex generator includes a pair of pre-emphasis networks for imposing pre-emphasis on respective ones of said left and right audio source signals, and wherein said demodulator means include a second pair of complementary de-emphasis networks for imposing compensating de-emphasis on said developed left and right audio source signals.

10. A stereophonic sound transmission system as defined in claim 9 wherein said pre-emphasis and de-emphasis networks have a time constant of approximately 25 microseconds.

11. A stereophonic sound transmission system as defined in claim 1 which further includes a pre-emphasis network disposed between said generator means and said transmitter means, and a complementary de-emphasis network disposed between said receiver means and said demodulator means.

12. A stereophonic sound transmission system as defined in claim 11 wherein said networks have a time constant of approximately 7.5 microseconds.

13. A stereophonic sound transmission system as defined in claim 12 wherein said generator means include circuit means for enhancing said second component by a factor of two with respect to said first component, and said demodulator means include complementary de-enhancement circuit means for enhancing said first component by a factor of two with respect to said second component.

14. A stereophonic sound transmission system as defined in claim 13 which further includes a pair of additional pre-emphasis networks between said left and right sources and said multiplex generator, and wherein said demodulator means include a pair of additional complementary de-emphasis networks for the left and right audio source signals developed therein.

15. A stereophonic sound transmission system as defined in claim 14 wherein said additional networks have a time constant of 25 microseconds.

16. A stereophonic sound transmission system as defined in claim 1 wherein said generator means include circuit means for enhancing said second component with respect to said first component, and said demodulator means include complementary deenhancement circuit means.

17. A stereophonic sound transmission system as defined in claim 16 wherein said second component is enhanced by a factor of 3 and deenhanced by a factor of 3.

18. A stereophonic sound transmission system as defined in claim 16 wherein said enhancement circuit means include first and second differential amplifiers, each having inverting and non-inverting input terminals, said left and right audio source signals being applied to said non-inverting terminals of said first and second amplifiers, respectively, and matrixing means comprising a first impedance connected between said inverting terminals, and second and third impedances connected between the outputs of said amplifiers to respective ones of said inverting terminals, said enhanced left and right audio source signals being developed at the outputs of respective ones of said amplifiers.

19. A stereophonic sound transmission system as defined in claim 16 wherein said deenhancement circuit means include first and second amplifiers, and matrixing means comprising first and second impedances serially connected between the left and right audio signals developed by said demodulator and the input terminals of respective ones of said amplifiers, and a third impedance connected between said input terminals.

20. A stereophonic sound transmission system as defined in claim 1 which further includes a pair of Dolby-B encoders coupled between said left and right audio sources and respective inputs of said multiplex generator, and a pair of Dolby-B decoders coupled to respective left and right audio source outputs of said demodulator means.

21. A stereophonic sound transmission system as defined in claim 20 which further includes a pair of pre-emphasis networks serially disposed with said Dolby-B encoders between said audio sources and said stereo generator, and a pair of de-emphasis networks serially disposed with said Dolby-B decoders at the output of said decoding means.

22. A stereophonic sound transmission system as defined in claim 21 wherein said pre-emphasis and de-emphasis networks have a 25 microsecond time constant.

23. A stereophonic sound transmission system as defined in claim 20 which further includes means for switching said Dolby-B encoders in and out of circuit, mode control means for adding a control signal component to said composite signal, and means responsive to said control effect associated with said receiver means for selectively switching said Dolby-B decoders in and out of circuit.

24. A stereophonic sound transmission system as defined in claim 23 wherein said left and right audio source signals each have a lower frequency limit, and said control signal component comprises a continuous-wave signal below said lower frequency limit.

25. A stereophonic sound transmission system as defined in claim 1 wherein said generator means include encoding means providing a transfer characteristic which increases the amplitude of low-level high frequency signals, the degree of increase decreasing with amplitude and increasing as a function of frequency, and said demodulator means include decoding circuit means having a complementary characteristic.

26. A stereophonic sound transmission system defined in claim 25 wherein said transfer characteristic substantially affects only signals above 20 KHz and extends substantially only to 53 KHz.

27. A stereophonic sound transmission system as defined in claim 2 wherein said left and right audio source signals have an upper limit of 15 KHz, said suppressed carrier is centered at 38 KHz, and said frequency-modulated signal has a maximum overall bandwidth of 106 KHz.

28. The method of transmitting within a television broadcast channel having defined frequency limits left and right audio source signals and a video source signal each having a predetermined upper frequency limit, said video source signal being amplitude modulated on a video carrier to form an AM signal occupying a first portion of said channel, comprising the steps of:
generating a composite signal including a first component representative of the sum of said left and right source signals, a second amplitude-modulated subcarrier component representative of the difference between said left and right signals, said subcarrier component having upper and lower sidebands centered about a suppressed subcarrier, and a pilot component having one-half the frequency of said suppressed subcarrier;
generating an RF sound carrier in said broadcast channel having a predetermined frequency spacing from said video-modulated signal;
modulating said sound carrier with said composite signal to form an FM signal occupying a second portion of said channel;
conveying said video- and audio-modulated signals in said broadcast channel to a receiving location, and at said receiving location,
developing said composite signal from said audiomodulated signal in said channel; and
developing said left and right audio source signals from said composite signal.

29. The method of transmitting stereophonic sound as defined in claim 28 wherein said sound carrier is separated from said video carrier in said channel by 4.5 MHz.

30. The method of transmitting stereophonic sound as defined in claim 28 wherein said video source signal has a predetermined horizontal scanning frequency, the frequency of said pilot component is 5/4 said horizontal scanning frequency, and the frequency of said subcarrier is twice the frequency of said pilot component.

31. The method of transmitting stereophonic sound as defined in claim 28 wherein said upper and lower sidebands each cause a maximum frequency deviation to said frequency-modulated carrier equal to one-half and maximum deviation caused by said first component.

32. The method of transmitting stereophonic sound as defined in claim 31 wherein said first component causes a maximum frequency deviation of 22.5 KHz to said frequency-modulated sound carrier and said upper and lower sidebands of said second component each cause a maximum frequency deviation of 11.25 KHz to said sound carrier.

33. The method of transmitting stereophonic sound as defined in claim 28 comprising the additional steps of:
introducing pre-emphasis to said left and right audio source signals at the transmitter location, and
introducing complementary de-emphasis to said developed left and right audio signals at said receiver location.

34. The method of transmitting stereophonic sound as defined in claim 33 wherein said pre-emphasis and de-emphasis have 25 microsecond time constants.

35. The method of transmitting stereophonic sound as defined in claim 28 which includes the further steps of:
applying preemphasis to said composite signal at the transmitter location; and
applying complementary deemphasis to said composite signal at the receiver location.

36. The method of transmitting stereophonic sound as defined in claim 35 wherein said preemphasis has a time constant of 7.5 microseconds.

37. The method of transmitting stereophonic sound as defined in claim 28 which includes the further steps of:
enhancing the level of said component with respect to said first component at the transmitter location; and
complementarily deenhancing the level of said second component with respect to said first component at the receiver location.

38. The method of transmitting stereophonic sound as defined in claim 37 wherein said second component is enhanced by a factor of 2.

39. The method of transmitting stereophonic sound as defined in claim 28 which includes the further steps of:
applying Dolby-B type encoding to said left and right audio source signals at said transmitter; and
applying complementary Dolby-B type decoding to said left and right audio output signals at said receiver.

40. The method of transmitting stereophonic sound as defined in claim 28 which includes the further steps of:
increasing low-level high-frequency portions of said composite signal at the transmitter location, said increase having a magnitude increasing with frequency and decreasing with amplitude; and having an upper frequency limit substantially corresponding to said upper frequency limit of said L-R signal; and
complementarily decreasing said composite signal at the receiver location.

41. The method of transmitting stereophonic sound as defined in claim 40 wherein only portions of said composite signal substantially between 20 KHz and 53 KHz are increased.

42. A receiver for receiving stereophonic sound transmissions included on a television broadcast channel of defined frequency limits, wherein said sound transmissions comprise a sound carrier frequency-modulated by a composite signal including a first component representative of the sum of the left and right source signals, a second amplitude modulated subcarrier component representative of the difference between the left and right signals, said subcarrier component having upper and lower sidebands centered about a suppressed subcarrier, and a pilot component having a frequency one-half the frequency of said suppressed carrier; said receiver comprising, in combination:
  tuner means for converting said television broadcast channel to an intermediate frequency channel including an intermediate frequency sound signal;
  sound bandpass filter means for separating said sound signal from said intermediate frequency channel;
  sound detector means for deriving from said intermediate frequency sound signal a composite signal including said first, second and third components; and
  stereo demodulator means for deriving said left and right source signals from said composite signal.

43. A receiver as defined in claim 42 wherein said intermediate frequency sound signal is centered at 10.7 MHz.

44. A receiver as defined in claim 42 wherein said tuner means comprise the tuner of an associated television receiver.

45. A receiver as defined in claim 42 which includes second conversion means comprising a mixer stage and a continuous wave oscillator, and wherein said intermediate frequency sound signal is converted by said conversion means to a second intermediate frequency and said sound intermediate frequency signal is applied to said detector.

46. A receiver as defined in claim 45 wherein said first intermediate frequency is 41.25 MHz and said second intermediate frequency is 10.7 MHz.

47. A receiver as defined in claim 42 wherein said intermediate frequency channel includes an intermediatefrequency video signal; and which further includes:
  video bandpass filter means for separating said video signal from said intermediate frequency channel;
  FM detector means for deriving from said intermediate frequency video signal an output signal representative of frequency shift in said video signal; and
  matrixing means for combining said output signal with said first component of said composite signal to compensate for frequency shift in said intermediate frequency channel.

48. A receiver as defined in claim 47 which includes first and second mixer stages and wherein the output of said sound bandpass filter is applied to said first mixer stage to develop a sound signal at a second intermediate frequency, said sound signal being applied to said sound detector, and wherein the output of said video bandpass filter is applied to said second mixer stage to develop an intermediate frequency video signal, and said intermediate frequency video signal is applied to said FM detector means.

49. A receiver as defined in claim 48 which includes a continuous wave oscillator, the output of said oscillator being applied to said first and second mixer stages to develop said second intermediate frequency sound and video signals.

50. A receiver as defined in claim 49 wherein said first intermediate frequency video signal is centered at 45.75 MHz, said first intermediate frequency audio signal is centered at 41.25 MHz, said second intermediate frequency video signal is centered at 6.2 MHz, said second intermediate frequency sound signal is centered at 10.7 MHz, and the frequency of said oscillator is 51.95 MHz.

51. A television sound converter for receiving on an FM stereo broadcast receiver adapted to receive signals having a predetermined maximum deviation within a predetermined frequency range stereophonic sound transmissions included on a television broadcast channel of defined frequency limits, wherein said sound transmissions comprise a sound carrier frequency-modulated by a composite signal including a first component representative of the sum of the left and right source signals, a second amplitude-modulated subcarrier component representative of the difference between the left and right signals, said subcarrier component having upper and lower sidebands centered about a suppressed carrier, and a pilot component representative of the phase and frequency of the suppressed carrier; said converter comprising, in combination:
  tuner means for converting said television broadcast channel to an intermediate frequency channel including an intermediate frequency sound signal, said signal having a frequency comprising a predetermined fraction of a predetermined reception frequency within said predetermined frequency range, and having a maximum frequency deviation equal to said predetermined fraction of said predetermined maximum deviation of said receiver, where said fraction has a numerator of unity and a denominator of integer n;
  frequency multiplier means for multiplying the frequency of an applied signal by a factor of n; and
  means for applying said sound signal to said frequency multiplier means to obtain an RF output signal for application to said FM broadcast receiver.

52. A television sound converter as defined in claim 51 wherein said predetermined fraction is ⅓, said predetermined maximum deviation of said receiver is 75 KHz, and said predetermined maximum deviation of said intermediate frequency signal is 25 KHz.

53. A television sound converter as defined in claim 52 wherein said intermediate frequency signal is centered at 30 MHz and tripled to 90 MHz by said frequency multiplier means for application to said FM stereo broadcast receiver.

54. A system for simultaneously transmitting first and second audio program sources in conjunction with a video source signal modulated on an RF carrier on a television broadcast channel having defined frequency limits, said system comprising, in combination:
  generator means including a stereo multiplex generator for generating from left and right applied input signals a composite signal including a first component representative of the sum of said left and right signals, a second amplitude-modulated subcarrier component representative of the difference between said left and right signals, said subcarrier component having upper and lower sidebands centered about a suppressed subcarrier, and a pilot component representative of the phase and having one-half the frequency of said suppressed subcarrier;

means for generating an RF sound carrier within said broadcast channel having a predetermined spacing from said video-modulated carrier, means for frequency-modulating said sound carrier with said composite signal;

receiver means for receiving said television broadcast channel including means for deriving said composite signal;

demodulator means for developing said first and second audio signals from said composite signal;

first matrixing means associated with said generator means for combining said first and second audio program sources to form said left and right input signals whereby said first component of said composite signal conveys only said first program source and said second component of said composite signal conveys only said second program source; and second matrixing means associated with said demodulator means for combining said left and right audio signals to form said first and second program sources, respectively.

55. A transmission system as defined in claim 54 wherein said first matrixing means comprise a pair of differential amplifiers; said first audio source being coupled through first and second impedances to the inverting imputs of said first and second amplifiers, respectively, and said second audio source being coupled through a third impedance to the inverting imput of said first amplifier and through a fourth impedance to the non-inverting imput of said second amplifier, the output of said first and second amplifiers comprising said left and right audio sources, respectively.

56. A transmission system as defined in claim 54 wherein said second matrixing means comprises a differential amplifier and left and right audio source means including a pair of impedances for coupling said source signals developed by said demodulator to the non-inverting and inverting imputs of said amplifier, the output of said amplifier comprising said second audio program source.

57. A transmission system as defined in claim 56 wherein said demodulator can be selectively operated in a monaural mode wherein the output of said demodulator comprises said first audio program source, and wherein user-actuable means are provided for conditioning said demodulator to operate in said monaural mode to obtain reception of said first audio program source.

58. A transmission system as defined in claim 54 wherein said first and second audio program sources comprise first and second different languages, respectively.

59. The method of transmitting stereophonic sound as defined in claim 28 wherein said left and right audio source signals have upper frequency limits of 15 KHz, said subcarrier component is centered at 38 KHz, and said pilot component is centered at 19 KHz.

* * * * *

UNITED STATES PATENT AND TRADEMARK OFFICE
CERTIFICATE OF CORRECTION

PATENT NO. : 4,048,654

DATED : September 13, 1977

INVENTOR(S) : Carl R. Wegner

It is certified that error appears in the above-identified patent and that said Letters Patent are hereby corrected as shown below:

column 7, line 48, "product" should be --produce-- column 8, line 7, "state" should be --stage-- column 8, line 59, "92" should be --91-- column 9, line 43, "product" should be --produce-- column 10, line 64, "turner" should be --tuner-- column 11, line 12, "If" should be --IF-- column 11, line 35, "spakers" should be --speakers-- column 12, line 30, "If" should be --IF-- column 13, line 56, "MHz" should be --KHz-- column 13, line 59, "and" first occurrence should be --the-- column 17, line 51, "zb zb zc" should be --za zb zc-- column 27, line 38, "sound" should be --second--

Signed and Sealed this

Twenty-third Day of May 1978

[SEAL]

Attest:

RUTH C. MASON
*Attesting Officer*

LUTRELLE F. PARKER
*Acting Commissioner of Patents and Trademarks*

REEXAMINATION CERTIFICATE (781st)
United States Patent [19]
Wegner

[11] B1 4,048,654
[45] Certificate Issued Nov. 10, 1987

[54] STEREOPHONIC TELEVISION SOUND TRANSMISSION SYSTEM

[75] Inventor: Carl R. Wegner, La Grange, Ill.

[73] Assignee: Telesonics, Inc., Chicago, Ill.

Reexamination Request
No. 90/001,040, Jun. 20, 1986
No. 90/001,081, Sep. 10, 1986
No. 90/001,129, Nov. 6, 1986

Reexamination Certificate for:
Patent No.: 4,048,654
Issued: Sep. 13, 1977
Appl. No.: 659,101
Filed: Feb. 18, 1986

Certificate of Correction issued May 23, 1978.

[51] Int. Cl.$^4$ ............................................ H04N 7/00
[52] U.S. Cl. ................................................ 358/144
[58] Field of Search .......................... 358/142-144, 358/198; 381/2

[56] References Cited

U.S. PATENT DOCUMENTS

| | | | |
|---|---|---|---|
| 2,505,754 | 5/1950 | Combs | 250/20 |
| 2,521,008 | 9/1950 | Homrighous | 178/5.6 |
| 2,851,532 | 9/1958 | Crosby | 179/15 |
| 2,851,532 | 9/1958 | Crosby | 179/15 |
| 3,046,329 | 7/1962 | Reesor | 178/5.6 |
| 3,071,643 | 1/1963 | Matthews | 178/5.6 |
| 3,099,707 | 7/1963 | Dome | 178/5.6 |
| 3,122,610 | 2/1964 | Csicsatka | 179/15 |
| 3,135,922 | 6/1964 | Eland | 325/461 |
| 3,219,769 | 11/1965 | Dome | 179/15 |
| 3,221,098 | 11/1965 | Feldman et al. | 178/5.8 |
| 3,257,511 | 6/1966 | Adler et al. | 179/15 |
| 3,440,432 | 4/1969 | Beltrami | 178/6.8 |
| 3,936,594 | 2/1976 | Schubin et al. | 178/5.1 |

OTHER PUBLICATIONS

"Stereophonic TV Sound", appearing in "Electronics", Oct. 30, 1959, p. 64.

"Sound-Multiplex Television Receiver" by Goro Suzuki appearing on pp. 7–12 of the "Toshiba Review", Jan.-Feb. 1970.

"Recent Developments in Stereo Broadcasting" by J. M. Carroll, appearing on pp. 41–46 of "Electronics", Apr. 3, 1959.

"TV Sound Tuner" by R. Graham appearing on pp. 46–48 of "Radio-Electronics", Jun. 1957.

"FM Stereo—The General Electric System" by A. Csicsatka and R. M. Linz, "Audio", Jun. 1961, pp. 24–28 (Csicsatka 1961)

"The New Stereo FM Broadcasting System—How to Understand the FCC Specifications and Generate the Composite Signal" by A. Csicsatka and R. M. Linz, "Journal of the Audio Engineering Society", Jan. 1962, vol. 10, No. 1, pp. 2–7 (Csicsatka 1962).

"A compatible FM Multiplex System for Stereophonic Television Service" by W. S. Halstead and R. W. Burden, "Journal of the Audio Engineering Society, Jan. 1962, vol. 10, No. 1, pp 16–22 (Halstead).

"A Compatible Stereophonic Sound System for Television" by F. T. Thompson and J. E. Lambright, IEEE Transactions on Broadcast Television Receivers", Dec. 1965, vol. BRT-11, No. 3, pp. 17–22 (Thompson).

"Stereo FM Multiplex Adapter Circuits" by M. S. Snitzer, Electronics World", Oct. 1961, pp. 40–41 (Snitzer).

"Television Simplified" Third Edition by M. S. Kiver, published by D. Van Nostrand Company, Inc., 1950, pp. 373–374 and Fig. 11-1 (Kiver 1950).

"Color Television Fundamentals" by M. S. Kiver, published by McGraw-Hill Book Co., Inc., 1955, pp. 60–63 (Kiver 1955).

C.C.I.R. (International Radio Consultative Committee) XIIth Plenary Assembly", New Delphi, 1970, vol. V, Part 1, Broadcasting Service (Sound) (Study Group 10), published by the International Telecommunications Union, Geneva, 1970, pp. 94–97 (CCIR).

"Dolby B-Type Noise Reduction System–Part 2" by R. Berkovitz and K. Gundry, "Audio", Oct. 1973, pp. 33–36 (Berkovitz).

(List continued on next page)

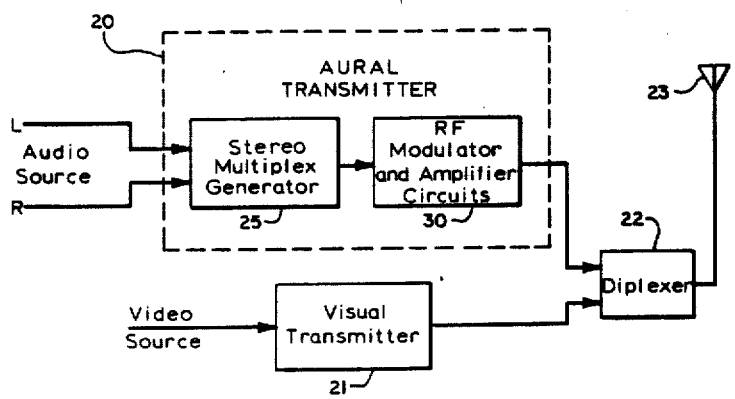

Other Publications

"Dolby B-Type Noise Reduction for FM Broadcast" by D. P. Robinson, Journal of the Audio Engineering Society, Jun. 1973, vol. 21, No. 5, pp. 351–356 (Robinson).

"Obtimum Use of Noise Reduction in FM Broadcasting" by R. M. Dolby of the "Journal of the Audio Engineering Society", vol. 21, No. 5, Jun. 1973, pp. 357–362 (Dolby).

"A Compatible Stereophonic Sound System for Television", *Proceedings of the National Electronics Conference*, vol. XXI, Oct. 25–27, 1965, by F. T. Thompson and J. E. Lambright (Thompson and Lambright).

"Survey of the Most Important Proposals for Transmitting Stereophony by Broadcasting", *NTZ,* 1961, No. 3, by K. Wilhelm (Wilhelm)—Including English Translation.

"Simultaneous Transmission of Two or More Sound Channels in Television", 1966–1970, *CCIR Report*, No. 403-1 (CCIR).

"Hi-Fi Stereo Sound for TV", *Radio Electronics*, vol. 45, No. 8, Aug. 1974, by L. Feldman (Feldman).

"Multiplex TV Sound Transmission", *Japan Electronic Engineering*, Oct. 1969, by H. Ando (Ando).

"Simultaneous Transmission of Two Television Sound Channels", *NHK Laboratories Note*, Serial No. 132, Feb. 1970, by Y. Numaguchi, Y. Ikeda and O. Akiyama (NHK).

"Binaural Sound on One FM Channel", *TV & Radio Engineering*, Aug.-Sep. 1953, M. G. Crosby (Crosby Article).

"A Survey of Stereophony as Applied to Broadcasting", *The Institution of Electrical Engineering*, Paper No. 3177E, Nov. 1959, by D. E. L. Shorter (Shorter).

"A Summary of the Present Position of Stereophonic Broadcasting", *BBC Engineering Monograph*, No. 29, Apr. 1960, by D. E. L. Shorter and G. J. Phillips (Shorter and Phillips).

"Dolby FM Broadcasting —A Quick Sketch", *Dolby Laboratories, Inc.*, 1975.

"UHF Radio Link for Transmission of High-Quality Stereophonic Programs", *Journal of the Audio Engineering Society*, Mar. 1972, vol. 20, No. 2 by Matti Otala (Otala).

"Multichannel Television Sound Transmission and Audio Processing Requirements for the BTSC System", *Office of Engineering and Technology*, OET Bulletin No. 60, Feb. 1986 (OET-60).

"FCC Rules and Regulations", Section 73.301 (1968) pp. 171–183 (FCC Stereo Srandards).

"National Association of Broadcasters Engineering Handbook", 1960, pp. 202–205, 214–217 (FCC Television Standards).

"Multiplex Audio and Stereophonics for Television", *Broadcast Engineering*, Technical Journal on Transmission and Reception, Sep., Oct., Nov., 1963, by Kashimura and Higami (Broadcast Engineering)

"Preliminary Draft of a Subcommittee Report on Technical Considerations in Choosing Standards For Stereo Sound on TV", Jun. 21, 1965, by Norman Parker (Parker Reference).

*Primary Examiner*—Robert L. Richardson

[57] ABSTRACT

A compatable stereophonic television sound transmission system for transmitting left and right audio signals in conjunction with a television broadcast wherein video information is conveyed on an amplitude-modulated carrier in a frequency channel having defined frequency limits. The system includes at a transmitter location a multiplex generator for generating a composite signal having a first component representative of the sum of the audio signals, a second component comprising an amplitude-modulated suppressed carrier subcarrier signal representative of the difference between the audio signals, and a pilot component representative of the phase and frequency of the suppressed carrier. The composite signal is utilized to frequency-modulate a sound carrier to develop an RF signal component which is added to the television channel at a discrete frequency spacing from the video carrier. The system includes at a receiver location a tuner for converting the transmission channel to an intermediate frequency, a filter for separating the sound signal therefrom, and a detector for deriving the composite signal from the sound signal. The composite signal is demodulated in a stereo demodulating stage to develop the left and right audio signals. Improved noise performance is obtained in the system by applying preemphasis to the left and right audio signals, preemphasis of the composite signal, enhancement of the second composite signal component, and/or Dolby-B processing of the left and right audio signals or to the composite signal. An adapter is shown for utilizing the system for bilingual programming.

B1 4,048,654

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–2, 16–36, 39 and 42–59 is confirmed.

Claims 13, 37 and 40 are determined to be patentable as amended.

Claims 14, 15, 38 and 41 dependent on an amended claim, are determined to be patentable.

New claims 60–109 are added and determined to be patentable.

13. A Stereophonic sound transmission system as defined in claim 12 wherein said generator means include circuit means for enhancing said second component by a factor of two with respect to said first component, and said demodulator means include complementary deenhancement circuit means for [enhancing] *deenhancing* said first component by a factor of two with respect to said second component.

37. The method of transmitting stereophonic sound as defined in claim 28 which includes the further steps of:
enhancing the level of said *second* component with respect to said first component at the transmitter location; and
complementarily deenhancing the level of said second component with respect to said first component at the receiver location.

40. The method of transmitting stereophonic sound as defined in [claim] *claims* 28, *37 or 38* which includes the further steps of:
increasing low-level high-frequency portions of said composite signal at the transmitter location, said increase having a magnitude increasing with frequency and decreasing with amplitude; and having an upper frequency limit substantially corresponding to said upper frequency limit of said L-R signal; and
complementarily decreasing said composite signal at the receiver location.

*60. A stereophonic television sound transmission system as defined in claim 1 wherein*
*said generator means include circuit means for enhancing the maximum deviation of said sound carrier by said second component such that said maximum deviation exceeds, by a predetermined enhancement factor, the maximum deviation of said sound carrier by said first component, and*
*said demodulator means include means for applying a deenhancement factor complementary to said predetermined enhancement factor in developing said left and right audio source signals.*

*61. A Stereophonic television sound transmission system as defined in claim 60 wherein said predetermined enhancement factor is approximately 2.*

*62. A stereophonic television sound transmission system as defined in claim 60 wherein said second component causes a predetermined maximum deviation level of said sound carrier which is equal to or greater than approximately 45 KHz.*

*63. A stereophonic television sound transmission system as defined in claims 1, 60, 61 or 62 wherein*
*said generator means develop from said left and right audio source signals an audio sum signal representative of the sum of said source signals and an audio difference signal representative of the difference between audio source signals,*
*said generator means include encoding circuit means for subjecting said audio difference signal to a transfer characteristic which increases the amplitude of low-level high frequency signals, the degree of increase decreasing with amplitude and increasing as a function of frequency, said second component of said generated composite signal being representative of said encoded audio difference signal, and*
*said demodulator means include decoding circuit means for subjecting the audio difference component of said derived composite signal to a complementary transfer characteristic.*

*64. A stereophonic television sound transmission system as defined in claim 63 including*
*circuit means for applying pre-emphasis to said first component of said composite signal at the transmitter location, and*
*circuit means for applying complementary de-emphasis to the first component of the derived composite signal at said receiver location.*

*65. A stereophonic television sound transmission system as defined in claim 64 wherein said pre-emphasis and de-emphasis each have a 75 microsecond time constant.*

*66. A stereophonic television sound transmission system as defined in claim 25 wherein*
*said generator means include circuit means for enhancing the maximum deviation of said sound carrier by said second component such that said maximum deviation exceeds, by a predetermined enhancement factor, the maximum deviation of said sound carrier by said first component, and*
*said demodulator means include means applying a deenhancement factor complementary to said predetermined enhancement factor in developing said left and right audio source signals.*

*67. A stereophonic television sound transmission system as defined in claim 66 wherein said predetermined enhancement factor is approximately 2.*

*68. A stereophonic television sound transmission system as defined in claim 66 wherein said second component causes a predetermined maximum deviation level of said sound carrier which is equal to or greater than approximately 45 KHz.*

*69. A stereophonic television sound transmission system as defined in claims 1, 66, 67 or 68 including*
*circuit means for applying pre-emphasis to said first component of said composite signal at the transmitter location, and*
*circuit means for applying complementary de-emphasis to the first component of the derived composite signal at said receiver location.*

70. A stereophonic television sound transmission system as defined in claim 69 wherein said pre-emphasis and de-emphasis each have a 75 microsecond time constant.

71. A stereophonic television sound transmission system as defined in claim 9 wherein said pre-emphasis and de-emphasis each have a 75 microsecond time constant.

72. A stereophonic television sound transmission system as defined in claim 60 wherein said upper and lower sidebands each cause a maximum frequency deviation to said frequency-modulated carrier equal to the maximum deviation caused by said first component.

73. A stereophonic television sound transmission system as defined in claims 1, 25, 60, 61 62, 66, 67 or 68 wherein said video source signal includes a horizontal scanning frequency component and said pilot and subcarrier signals are synchronous with said horizontal scanning frequency.

74. A system for receiving and transmitting stereophonic television sound as defined in claims 16, 60, 62, 66 or 68 wherein said enhancement factor is not less than approximately two and not greater than three.

75. The method of transmitting and receiving stereophonic television sound as defined in claim 28 including enhancing the maximum deviation of said sound carrier by said second component such that said maximum deviation exceeds, by a predetermined enhancement factor, the maximum deviation of said sound carrier by said first component, and deenhancing the audio difference component of said derived composite signal by a deenhancement factor complementary to said predetermined enhancement factor in developing said left and right audio source signals.

76. The method of transmitting and receiving stereophonic television sound as defined in claim 75 wherein said predetermined enhancement factor is approximately 2.

77. The method of transmitting and receiving stereophonic television sound as defined in claim 75 wherein said second component causes a predetermined maximum deviation level of said sound carrier which is equal to or greater than approximately 45 KHz.

78. The method of transmitting and receiving stereophonic television sound as defined in claims 28, 75, 76 or 77 including:

developing from said audio source signals an audio sum signal representative of the sum of said audio source signals, and an audio difference signal representative of the difference between said audio source signals;

encoding said audio difference signal in accordance with a predetermined transfer characteristic which increases the amplitude of low-level high-frequency signals, the degree of increase decreasing with amplitude and increasing as a function of frequency, said second component of said generated composite signal being representative of said encoded audio difference signal; and at the receiving location, decoding the audio difference component of said derived composite signal in accordance with a predetermined transfer characteristic complementary to that of the encoding of said audio difference signal.

79. The method of transmitting and receiving stereophonic television sound as defined in claim 78 including applying pre-emphasis to the first component of the composite signal at the transmitter location, and applying complementary deemphasis to the first component of the derived composite signal at the receiver location.

80. The method of transmitting and receiving television stereophonic sound as defined in claim 79 wherein said pre-emphasis and deemphasis are each accomplished with a 75 microsecond time constant.

81. The method of transmitting and receiving stereophonic television sound as defined in claim 28 including applying pre-emphasis to said first component of said composite signal at the transmitter location, and applying complementary deemphasis to the first component of the derived composite signal at the receiver location.

82. The method of transmitting and receiving stereophonic television sound as defined in claims 33 or 81 wherein said pre-emphasis and deemphasis are each accomplished with a 75 microsecond time constant.

83. The method of transmitting and receiving stereophonic television sound as defined in claim 40 including applying pre-emphasis to said first component of said composite signal at the transmitter location, and applying complementary deemphasis to the first component of the derived composite signal at the receiver location.

84. The method of transmitting and receiving stereophonic television sound as defined in claim 83 wherein said pre-emphasis and deemphasis are each accomplished with a 75 microsecond time constant.

85. The method of transmitting and receiving stereophonic television sound as defined in claims 28, 75, 76, 77 or 81 wherein said pilot and subcarrier are generated in synchronism with the scanning frequency of said video signal.

86. A method for receiving and transmitting stereophonic television sound as defined in claims 37, 75 or 77 wherein said enhancement factor is not less than approximately two and not greater than three.

87. A receiver for receiving stereophonic television sound transmissions as defined in claim 42 wherein the maximum deviation of the sound carrier by the second component exceeds the maximum deviation of the sound carrier by the first component by a predetermined enhancement factor, and said receiver includes deenhancement circuit means for applying a deenhancement factor complementary to said predetermined enhancement factor in deriving said left and right audio source signals.

88. A receiver for receiving stereophonic television sound transmissions as defined in claim 87 wherein said enhancement factor is approximately two.

89. A receiver for receiving stereophonic television sound transmissions as defined in claim 87 wherein the second component of said composite signal causes a predetermined maximum deviation level of said sound carrier which is equal to or greater than approximately 50 KHz.

90. A receiver for receiving stereophonic sound transmissions as defined in claims 42, 87, 88 or 89 wherein the second component of the transmitted signal is representative of the difference between the left and right audio source signals encoded to increase the amplitude of relatively low-level high-frequency signals in accordance with a predetermined encoding transfer characteristic, the degree of increase decreasing with amplitude and increasing as a function of frequency, and said receiver demodulator means include decoding means for applying a decoding transfer characteristic complementary to said encoding transfer characteristic to the audio difference component of said derived composite signal in deriving said audio source signals.

91. A receiver for receiving stereophonic television sound transmissions as defined in claim 90 wherein pre-emphasis is applied to the first component of the generated composite signal and said receiver demodulator means include circuit means for applying complementary deemphasis to the first component of said derived composite signal in deriving said left and right audio source signals.

92. A receiver for receiving stereophonic television sound transmissions as defined in claim 91 wherein said pre-emphasis and deemphasis each have a 75 microsecond time constant.

93. A receiver for reproducing stereophonic left and right audio source signals from a stereophonic sound transmission included on a television broadcast channel of defined frequency limits wherein said sound transmissions comprise a sound carrier frequency-modulated by a composite signal, comprising:

tuner means for converting said television broadcast channel to an intermediate frequency channel including an intermediate frequency sound signal;
   sound bandpass filter means for separating said sound signal from said intermediate frequency channel;
   sound detector means for deriving from said intermediate frequency sound signal a composite signal having a first component representative of the sum of said audio source signals, a second double sideband amplitude modulated suppressed subcarrier component representative of the difference between said audio source signals, and a third component comprising a pilot signal having a frequency equal to one-half the frequency of said suppressed subcarrier; and
   stereo demodulator means coupled to said sound detector means for deriving said first, second and third composite signal components, said audio sum component and said audio difference component, and for developing from said audio sum and difference components said left and right audio source signals.

94. A receiver for receiving stereophonic television sound transmissions as defined in claim 93 wherein the maximum deviation of the sound carrier by the second component exceeds the maximum deviation of the sound carrier by the first component by a predetermined enhancement factor, and said receiver includes deenhancement circuit means for applying a deenhancement factor complementary to said predetermined enhancement factor in deriving said left and right audio source signals.

95. A receiver for receiving stereophonic television sound transmissions as defined in claim 94 wherein said enhancement factor is approximately two.

96. A receiver for receiving stereophonic television sound transmissions as defined in claim 94 wherein the second component of said composite signal causes a predetermined maximum deviation level of said sound carrier which is equal to or greater than approximately 45 KHz.

97. A receiver for receiving stereophonic television sound as defined in claims 93, 94, 95 or 96 wherein the second component of the transmitted signal is representative of the difference between the left and right audio source signals encoded to increase the amplitude of relatively low-level high-frequency signals in accordance with a predetermined encoding transfer characteristic, the degree of increase decreasing with amplitude and increasing as a function of frequency, and said receiver demodulator means include decoding means for applying a decoding transfer characteristic complementary to said encoding transfer characteristic to the audio difference component of said derived composite signal in deriving said audio source signals.

98. A receiver for receiving stereophonic television sound transmissions as defined in claim 97 wherein pre-emphasis is applied to the first component of the generated composite signal and said receiver demodulator means include circuit means for applying complementary deemphasis to the first component of the derived composite signal in deriving said left and right audio source signals.

99. A receiver for receiving stereophonic television sound transmissions as defined in claim 98 wherein said pre-emphasis and deemphasis each have a 75 microsecond time constant.

100. A receiver for receiving stereophonic television sound transmissions as defined in claims 42 or 93 wherein pre-emphasis is applied to the first component of the generated composite signal and said receiver demodulator means include circuit means for applying complementary deemphasis to the first component of said derived composite signal in deriving said left and right audio source signals.

101. A receiver for receiving stereophonic television sound transmissions as defined in claim 100 wherein said pre-emphasis and deemphasis each have a 75 microsecond time constant.

102. A receiver for receiving stereophonic television sound transmissions as defined in claims 42 or 93 wherein said intermediate-frequency channel includes a video intermediate-frequency carrier and a sound intermediate-frequency carrier, and said sound bandpass filter means include a sound intermediate-frequency amplifier for amplifying only said sound carrier, and wherein said sound detector means are coupled to the output of said sound intermediate-frequency amplifier and include means for detecting said intermediate-frequency sound carrier.

103. A receiver for receiving stereophonic television sound transmissions as defined in claims 42, 87, 88, 89, 93, 94, 95 or 96 wherein said broadcast channel includes a video signal having a horizontal scanning frequency component, and said stereo demodulator means include means for regenerating said subcarrier from said pilot component at a frequency synchronous with the scanning ferquency component of said video signal.

104. A receiver for receiving stereophonic television sound transmissions as defined in claims 87, or 94 wherein said enhancement factor is not less than approximately two and not greater than three.

105. A stereophonic television sound transmission system as defined in claim 16 which further includes;
   circuit means for applying a preselected pre-emphasis to said first component of said composite signal at the transmitter location;
   circuit means for applying a de-emphasis to said first component at said receiver location, said de-emphasis being inversely related to said preselected pre-emphasis;
   encoding circuit means within said generator means for providing a transfer characteristic to said audio difference signal which is a function of the amplitude and frequency of said audio difference signal;
   decoding circuit means within said demodulator means for providing a predetermined transfer characteristic to said audio difference signal which is complementary to said encoding circuit means transfer characteristic;
   scanning signal means within said generator means for developing a horizontal scanning frequency signal as a part of said video source signal;
   pilot signal means within said generator means for developing said one-half frequency pilot signal frequency and phase related to said horizontal scanning signal; and circuit means within said demodulator means for generating said suppressed subcarrier signal from said pilot signal and for utilizing said generated subcarrier signal to demodulate said second component.

106. A stereophonic television sound transmission system as defined in claim 105 wherein:
said left and right audio source signals have upper frequency limits of approximately 15 KHz, said one-half frequency pilot signal is of a frequency greater than the upper frequency limits of said audio source signals, said enhancement means causes a predetermined maximum deviation level of said sound carrier by said second component substantially greater than 25 KHz and said pre-emphasis and de-emphasis are of fixed time constant complementary values.

107. A stereophonic television sound transmission system as defined in claim 106 wherein said second component maximum deviation level is equal to or greater than approximately 45 KHz.

108. A receiver as defined in claims 42 or 93 in which said stereo demodulator means further includes:

de-emphasis circuit means for applying a predetermined de-emphasis to said first component;
decoding circuit means for providing a predetermined transfer characteristic to the audio difference component of said derived composite signal which is a function of the amplitude and frequency of said audio difference component;
deenhancement circuit means for deenhancing said second component relative to said first component; and
subcarrier circuit means for generating said suppressed subcarrier signal from said pilot signal and for utilizing said generated subcarrier to demodulate said second component.

109. A receiver as defined in claim 108 wherein said de-emphasis circuit means applies a fixed time constant de-emphasis to said first component and said deenhancement circuit means deenhances said second component relative to said first component by a factor not less than approximately two and not greater than three.

* * * * *